US008874474B2

(12) United States Patent
Wakai et al.

(10) Patent No.: US 8,874,474 B2
(45) Date of Patent: Oct. 28, 2014

(54) COMMUNICATION SERVER, COMMUNICATION METHOD, MEMORY MEDIUM AND INTEGRATED CIRCUIT FOR MEDIATING REQUESTS FOR CONTENT DELIVERY ACCORDING TO EXPECTATION VALUES OF A PROBABILITY OF ACCEPTANCE OF THE REQUEST, DESIRED LOCATION, AND HISTORY INFORMATION

(75) Inventors: Ryohei Wakai, Osaka (JP); Takahisa Fujita, Osaka (JP); Yuzo Kawamura, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 13/979,238

(22) PCT Filed: Mar. 7, 2012

(86) PCT No.: PCT/JP2012/001553
§ 371 (c)(1),
(2), (4) Date: Jul. 11, 2013

(87) PCT Pub. No.: WO2012/127799
PCT Pub. Date: Sep. 27, 2012

(65) Prior Publication Data
US 2013/0298150 A1 Nov. 7, 2013

(30) Foreign Application Priority Data

Mar. 23, 2011 (JP) ................................ 2011-064288

(51) Int. Cl.
*G06Q 30/00* (2012.01)
(Continued)

(52) U.S. Cl.
CPC ..... *H04N 21/44222* (2013.01); *G06Q 20/3224* (2013.01); *G06Q 20/123* (2013.01);
(Continued)

(58) Field of Classification Search
CPC .............. G06Q 30/06; G06Q 30/0601; G06Q 20/3224; G06Q 20/123; G06Q 30/0605; G06Q 30/08; G06Q 30/0639; G06Q 30/0641; G06Q 10/10; H04N 21/44222; H04N 3007/17372
USPC ........... 705/26.1, 26.2, 26.3, 26.4, 26.9, 27.1, 705/346; 709/217, 205; 348/E7.083; 725/9, 725/16
See application file for complete search history.

(56) References Cited

U.S. PATENT DOCUMENTS

| 5,859,979 | A | * | 1/1999 | Tung et al. ..................... 709/228 |
| 6,269,394 | B1 | * | 7/2001 | Kenner et al. ................. 709/217 |

(Continued)

FOREIGN PATENT DOCUMENTS

| JP | 2002-374514 | 12/2002 |
| JP | 2003-256684 | 9/2003 |

(Continued)

OTHER PUBLICATIONS

International Search Report issued Apr. 3, 2012 in International (PCT) Application No. PCT/JP2012/001553.
(Continued)

*Primary Examiner* — Hoang-Vu A Nguyen-Ba
(74) *Attorney, Agent, or Firm* — Wenderoth, Lind & Ponack, L.L.P.

(57) ABSTRACT

A communication server 200 acquires a request specifying a desired location for content creation from a requester terminal 310, and provides a notification of the request to an accepter terminal 300 accepting the content creation. The notification history managing unit 206 stores, as notification history, the distance from an accepter terminal to be provided with the notification to the desired recoding location and acceptance information. Upon acquisition of a new request, a request notification terminal selecting unit 203 selects accepter terminal 300 that is likely to accept the request according to the notification history, and the request notifying unit 204 provides the selected accepter terminal 300 with the notification.

11 Claims, 29 Drawing Sheets

(51) Int. Cl.
*H04N 21/442* (2011.01)
*G06Q 20/32* (2012.01)
*G06Q 20/12* (2012.01)
*G06Q 30/06* (2012.01)
*G06Q 30/08* (2012.01)
*G06Q 10/10* (2012.01)
*H04N 21/6371* (2011.01)
*H04W 4/02* (2009.01)
*H04N 21/2747* (2011.01)
*H04N 21/433* (2011.01)
*H04N 21/472* (2011.01)
*G06F 15/16* (2006.01)
*H04N 9/00* (2006.01)
*H04N 7/173* (2011.01)

(52) U.S. Cl.
CPC ........ *G06Q 30/0601* (2013.01); *G06Q 30/0605* (2013.01); *G06Q 30/08* (2013.01); *G06Q 30/0639* (2013.01); *G06Q 30/0641* (2013.01); *G06Q 10/10* (2013.01); *H04N 2007/17372* (2013.01); *H04N 21/6371* (2013.01); *H04W 4/022* (2013.01); *H04N 21/2747* (2013.01); *H04N 21/4334* (2013.01); *H04N 21/47214* (2013.01)

USPC ....... 705/26.1; 705/26.2; 705/26.3; 705/26.4; 705/26.9; 705/27.1; 705/346; 709/205; 725/9; 725/16

(56) References Cited

U.S. PATENT DOCUMENTS

| 7,797,255 | B1* | 9/2010 | Hastings ...................... 705/313 |
| 2004/0054609 | A1 | 3/2004 | Takahashi |
| 2008/0297586 | A1* | 12/2008 | Kurtz et al. ................ 348/14.08 |
| 2010/0083303 | A1* | 4/2010 | Redei et al. .................... 725/32 |
| 2011/0258066 | A1 | 10/2011 | Takahashi |
| 2012/0069131 | A1* | 3/2012 | Abelow ................. 348/14.01 |
| 2012/0303754 | A1 | 11/2012 | Takahashi |

FOREIGN PATENT DOCUMENTS

| JP | 2005-250796 | 9/2005 |
| JP | 2008-217831 | 9/2008 |
| JP | 2010-67169 | 3/2010 |
| WO | 02/077868 | 10/2002 |

OTHER PUBLICATIONS

Web site of ustream, <URL: http://www.ustream.tv/>, Top page only.

* cited by examiner

FIG. 5

| Video recorder terminal ID | User ID | Location information | Location update time | Broadcast status |
|---|---|---|---|---|
| CAM1 | USER1 | X1, Y1 | DATE1 | WAITING |
| CAM2 | USER3 | X2, Y2 | DATE2 | BROADCASTING |
| CAM3 | USER4 | X3, Y3 | DATE3 | PREPARING |
| ... | ... | ... | ... | ... |

| Delivery number | User ID | Video recorder terminal ID | Delivery commencement time | Delivery termination time | Request number |
|---|---|---|---|---|---|
| DIST1 | USER7 | CAM4 | DATE4 | DATE5 | REQ3 |
| DIST2 | USER8 | CAM5 | DATE6 | DATE7 | NULL |
| ... | ... | ... | ... | ... | ... |

FIG. 9

| Notification number | User ID | Video recorder terminal ID | Location at the time of the notification | Desired recording location | Acceptance information | Notification time |
|---|---|---|---|---|---|---|
| NOTICE1 | USER9 | CAM6 | X6, Y6 | X7, Y7 | TRUE | DATE8 |
| NOTICE2 | USER10 | CAM7 | X8, Y8 | X9, Y9 | FALSE | DATE9 |
| ... | ... | ... | ... | ... | ... | ... |

FIG. 22

| Distance at the time of the notification | Notification time | Acceptance information |
|---|---|---|
| D3 | DATE10 | TRUE |
| D4 | DATE11 | TRUE |
| ⋮ | ⋮ | ⋮ |

| Distance at the time of the notification | Location at the time of the notification | Acceptance information |
|---|---|---|
| D5 | X16, Y16 | TRUE |
| D6 | X17, Y17 | FALSE |
| ⋮ | ⋮ | ⋮ |

2400

COMMUNICATION SERVER, COMMUNICATION METHOD, MEMORY MEDIUM AND INTEGRATED CIRCUIT FOR MEDIATING REQUESTS FOR CONTENT DELIVERY ACCORDING TO EXPECTATION VALUES OF A PROBABILITY OF ACCEPTANCE OF THE REQUEST, DESIRED LOCATION, AND HISTORY INFORMATION

TECHNICAL FIELD

The present invention relates to a communication server and a communication method for mediating requests pertaining to content delivery.

BACKGROUND ART

In recent years, portable terminals connectable to the Internet such as portable telephones and smartphones have become common, and accordingly real-time information delivery services using the Internet have become common.

For example, there is a service that offers real-time delivery of a video that is being recorded by a video recorder terminal such as a portable terminal equipped with a camera. The live video that is being recorded by a video recorder terminal is transmitted from the video recorder terminal to a delivery server, and the delivery server delivers the live video to a viewer terminal. This service allows the user of the viewer terminal to view the live video in real time at a distant location.

In such a real-time information delivery service, several information delivery technologies have been proposed to realize delivery of content such as a video that is being recorded at the location desired by the user of the viewer terminal (e.g. see Patent Literature 1 and Patent Literature 2).

According to the approach discussed in Patent Literature 1, the delivery server first acquires from a requester terminal a delivery request specifying a desired location for content creation. The delivery server then provides a notification of the delivery request to an accepter terminal near the desired location, selected from among accepter terminals that would accept the content creation. The accepter terminal creates the content at the desired location specified in the delivery request, and transmits the content to the delivery server. The delivery server is thus capable of delivering content created at any location desired by the requester terminal.

According to the approach discussed in Patent Literature 2, upon acquisition of the delivery request including the desired location of the content creation from the requester terminal, the delivery server presents information about the accepter terminals near the desired location to the requester terminal. The requester terminal selects the accepter terminal based on the information thus presented, and the delivery server provides a notification of the delivery request to the accepter terminal thus selected. The accepter terminal creates the content at the desired location specified in the delivery request, and transmits the content to the delivery server. The delivery server is thus capable of delivering content created at any location desired by the requester terminal.

CITATION LIST

Patent Literature

[Patent Literature 1] Japanese Patent Application Publication No. 2002-374514

[Patent Literature 2] Japanese Patent Application Publication No. 2008-217831

SUMMARY OF INVENTION

Technical Problem

Some of the users of the accepter terminals willingly accept the request, but others do not. Some users accept the request even though they are distant from the desired location, whereas some users deny the request even though they are close to the desired location.

With the above-described conventional structures, however, it is difficult to provide a notification of the request to the users of the accepter terminals who are willing and possibly accept the request even though they are distant from the desired location, because the accepter terminals to be provided with the notification are limited to those located near the desired location.

Furthermore, it is desired not to provide the notification of the request to users who are not willing and not likely to accept the request even though they are close to the desired location, because the notification of the request is unnecessary information for such users.

The present invention is made in view of the problems described above, and aims to provide a communication server that can provide the notification of the request to the accepter terminals that are likely to accept the request.

Solution to Problem

To solve the problem, a notification device pertaining to the present invention includes: a request acquiring unit that acquires a request specifying a desired location for content creation; a terminal location acquiring unit that acquires locations of a plurality of accepter terminals, each capable of performing the content creation; a notifying unit that provides a notification of the request to an accepter terminal selected from among the accepter terminals; an acceptance information acquiring unit that acquires acceptance information showing whether or not the accepter terminal provided with the notification of the request has accepted the request; a history managing unit that manages history information showing a history of notifications provided by the notifying unit in the past, the history information containing for each notification: a location at the time of provision of the notification, of an accepter terminal provided with the notification; the desired location specified in the corresponding request; and the acceptance information; and a selecting unit that, upon acquisition of a new request, selects an accepter terminal to be provided with a notification of the new request, according to: the locations of the accepter terminals; the desired location specified in the new request; and the history information.

Advantageous Effects of Invention

A communication server pertaining to the present invention manages history information showing, for each request notification in the past: the location of the accepter terminal at the time of provision of the notification; the desired location specified in the notified request; and the acceptance information of the request. With this structure, the communication server is capable of obtaining the degree of the tendency of each accepter terminal to accept a request, according to the distance of each accepter terminal, and providing a notification to the accepter terminals that are likely to accept the request.

BRIEF DESCRIPTION OF DRAWINGS

FIG. 5 shows a specific example of a video recorder terminal information database pertaining to Embodiment 1 of the present invention.

FIG. 8 shows a specific example of a delivery history information database pertaining to Embodiment 1 of the present invention.

FIG. 9 shows a specific example of a notification history information database pertaining to Embodiment 1 of the present invention.

FIG. 22 shows a specific example of the actual acceptance database.

FIG. 24 shows a specific example of the actual acceptance database.

DESCRIPTION OF EMBODIMENTS

The following describes an embodiment of the present invention with reference to the drawings.

1. Overview

Figure 1:
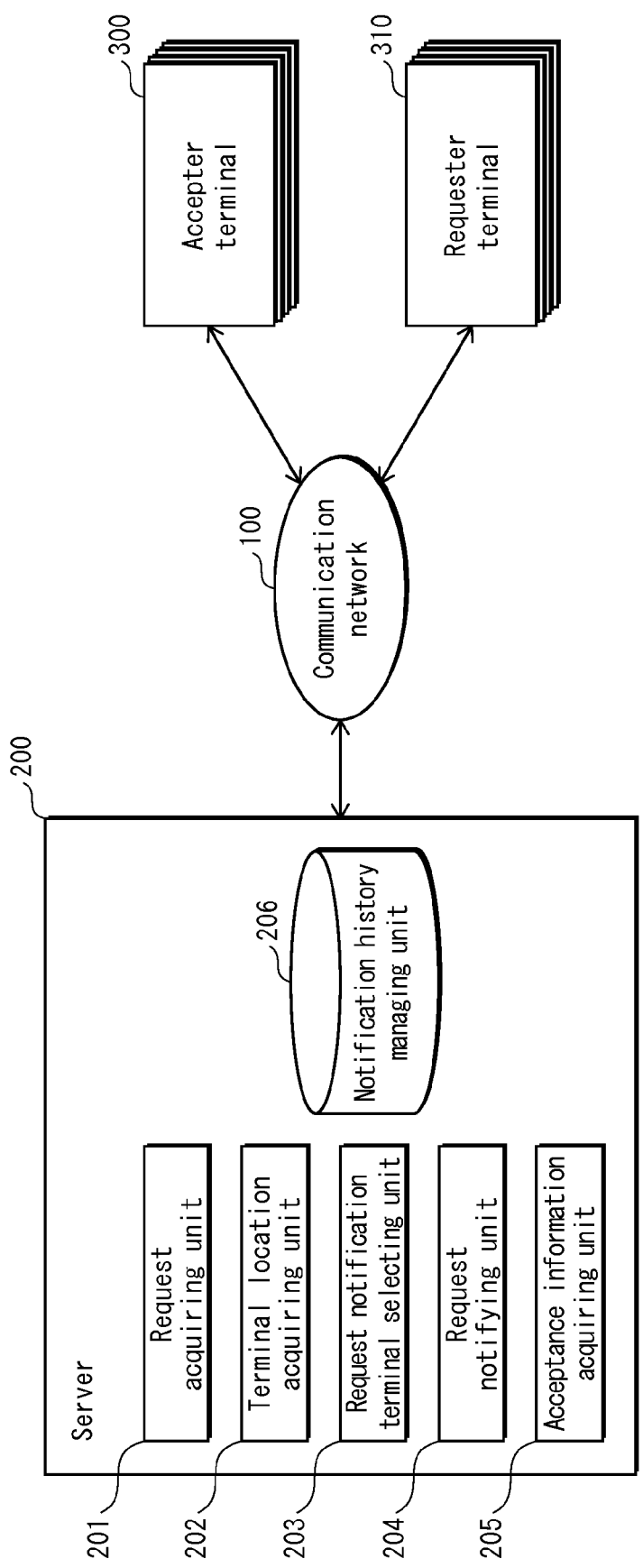
FIG. 1 shows an overview of a request notification system including a communication server pertaining to the present invention.

FIG. 1 shows an overview of a request notification system including a communication server pertaining to the present invention. As shown in FIG. 1, the request notification system includes a communication network 100, a communication server 200, a plurality of accepter terminals 300 and a plurality of requester terminals 310. The communication server 200 is connected to the plurality of accepter terminals 300 and the plurality of requester terminals 310 via the communication network 100. The communication server 200 provides the accepter terminals 300 with a notification of a request related to content creation, received from the requester terminals 310.

The request issued by the requester terminals 310 specifies the desired location for creating the content. The accepter terminals 300 travel to the desired location according to the specification, and create the content.

The communication server 200 includes: a request acquiring unit 201 that acquires the request from the requester terminals 310; a terminal location acquiring unit 202 that acquires the locations of the accepter terminals 300; a request notification terminal selecting unit 203 that selects the accepter terminals 300 to be provided with the notification of the request; a request notifying unit 204 that provides the notification of the request to the accepter terminals 300; an acceptance information acquiring unit 205 that acquires acceptance information indicating whether the accepter terminal provided with the notification has accepted the request; and a notification history managing unit 206 that manages the history related to the requests notified in the past.

The notification history managing unit 206 manages the history of the notifications in the past. The history includes the following for each notification: the location information showing the location of the accepter terminal when the accepter terminal is provided with the notification; the desired location specified in the notified request; and the acceptance information indicating whether the notified request were accepted or not.

When the request acquiring unit 201 acquires a new request from the requester terminal 310, the request notification terminal selecting unit 203 uses the current locations of the accepter terminals 300, the desired location included in the request and the history information described above to select the accepter terminals 300 that are likely to accept the request.

2. Embodiment 1

2-1. Structure

Figure 2:
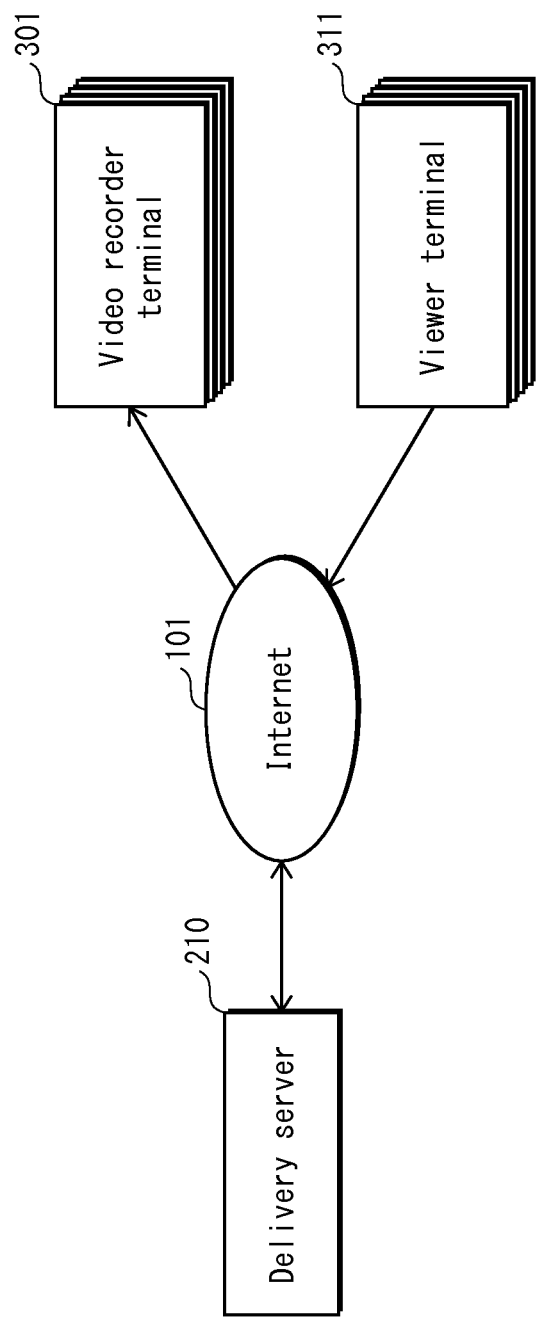
FIG. 2 shows an overall structure of a live video delivery system pertaining to Embodiment 1 of the present invention.

FIG. 2 shows an overall structure of a live video delivery system as an embodiment of the request notification system pertaining to the present invention. This live video delivery system offers a live video delivery service for delivering videos recorded by the plurality of video recorder terminals 301 to the plurality of viewer terminals 311 in real time by using the Internet 101.

The users of the video recorder terminals 301 and the users of the viewer terminals 311, as recording users and viewing users respectively, register their respective user IDs and passwords. These users use the service by logging in the live video delivery system by using the registered user IDs and passwords.

The video recorder terminals 301 correspond to the accepter terminals 300 shown in the overview. The video recorder terminals 301 record a live video at the recording location desired by the viewing user according to the delivery request received from the delivery server 210, and transmit the recorded live video to the delivery server 210. The video recorder terminals 301 do not necessarily rely on the delivery request, and may transmit, to the delivery server 210, the live video recorded by the recording users' own free will.

The video recorder terminals 301 are recording devices connectable to the Internet 101 via a mobile telephone communication network, a wired or wireless LAN (Local Area Network), or the like. Examples of the video recorder terminals 301 include portable telephones equipped with a camera, smartphones equipped with a camera, surveillance cameras, and personal computers with a Web camera connected thereto.

The viewer terminals 311 correspond to the requester terminals 310 shown in the overview. The viewer terminals 311 have the functions of: transmitting to the delivery server 210 the delivery request, including the specification of the recording location desired by the viewing user; and receiving and playing the live video being delivered by the delivery server 210.

The viewer terminals 311 are devices connectable to the Internet 101 and capable of playing movie pictures. Examples of the viewer terminal 311 include portable telephones, smartphones, personal computers and televisions.

The delivery server 210 plays a central role of the live video delivery system. As with the communication server 200 shown in the overview, the delivery server 210 has the functions of: providing the video recorder terminals 301 with the notification of the request from the viewer terminals 311; receiving live videos from the video recorder terminals 301 and managing the videos; and delivering live videos to the viewer terminals 311.

Figure 3:
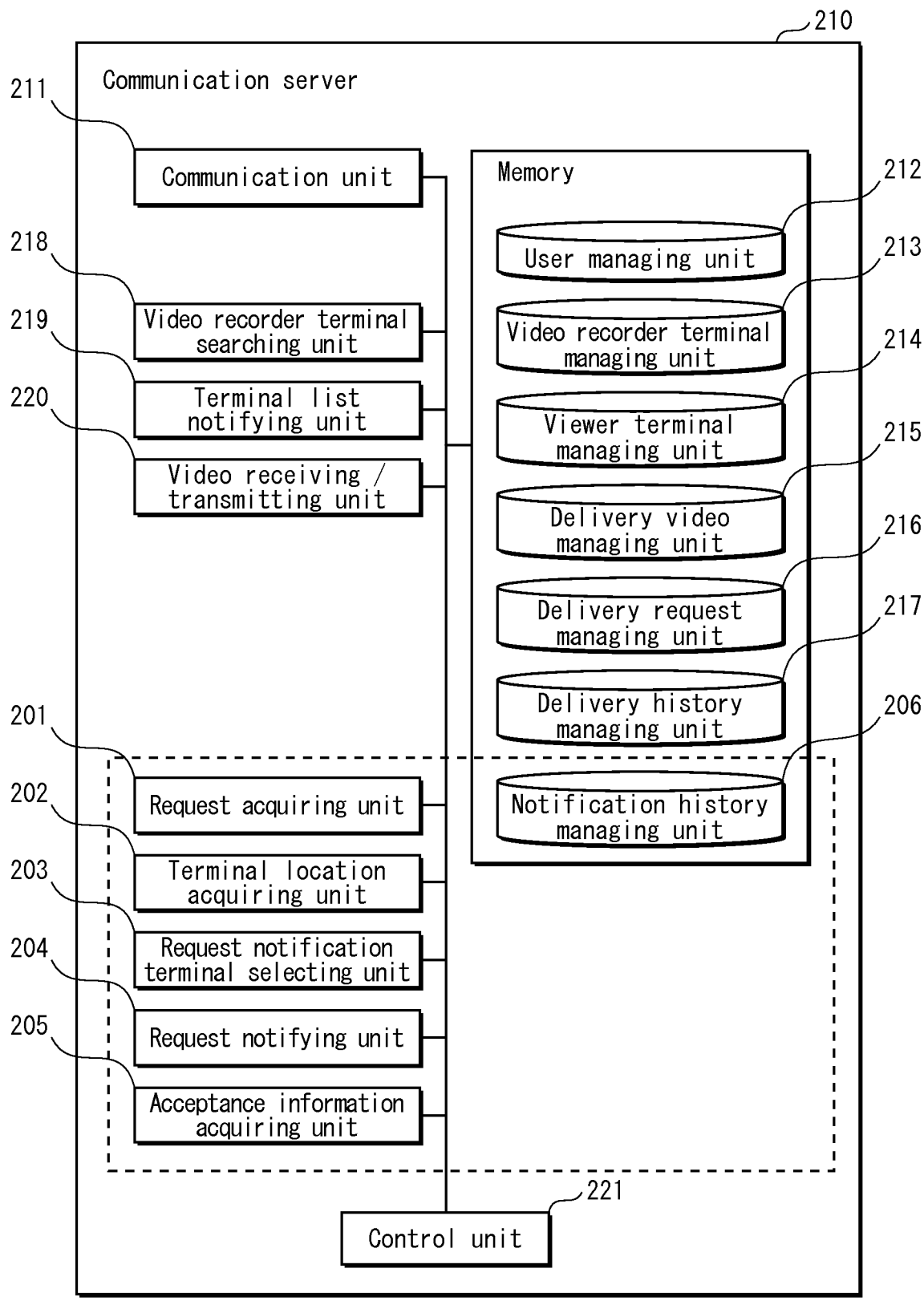
FIG. 3 shows an internal structure of a delivery server pertaining to Embodiment 1 of the present invention.

The following describes the internal structure of the delivery server 210 in detail. FIG. 3 shows the internal structure of the delivery server 210. In addition to the components of the communication server 200 shown in the overview, the delivery server 210 further includes a communication unit 211, a user managing unit 212, a video recorder terminal managing unit 213, a viewer terminal managing unit 214, a delivery video managing unit 215, a delivery request managing unit 216, a delivery history managing unit 217, a video recorder terminal searching unit 218, a terminal list notifying unit 219, a video receiving/transmitting unit 220, and a control unit 221.

The communication unit 211 is a unit for connecting to the Internet 101. The communication unit 211 mediates between the other components of the delivery server 210 and the video recorder terminals 301 and between the other components and the viewer terminals 311, and transmits and receives various kinds of data.

Figure 4:
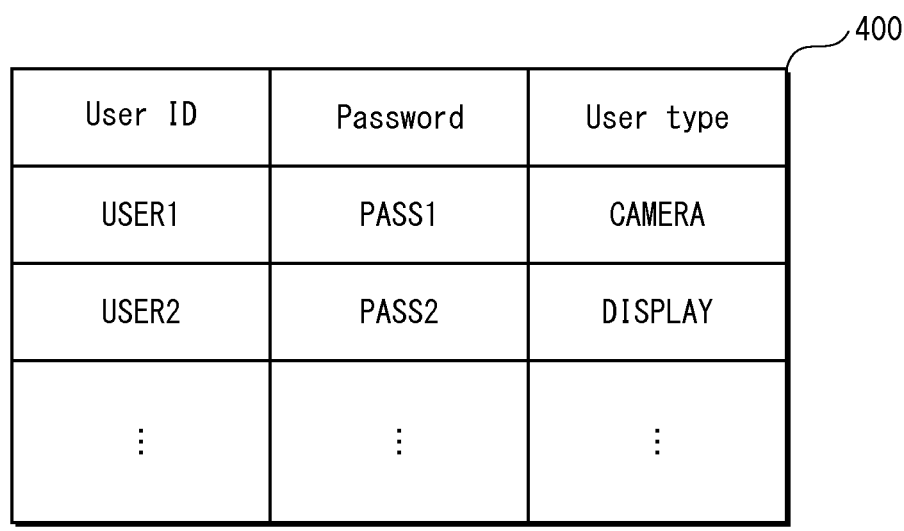
FIG. 4 shows a specific example of a user information database pertaining to Embodiment 1 of the present invention.

The user managing unit 212 manages user information database 400, a specific example of which is shown in FIG. 4. The user information database 400 is composed of a set of user records of the users registered in the live video delivery system, each user record showing personal information of a user. Each user record is composed of fields for a user ID, a password, and a user type.

The user ID field stores the user ID assigned to each user at the time of the user registration. The user ID is used for identifying the user. The password field stores a character string used for verification at the time of the logging in. The user type field stores a variable used for distinguishing between the recording user ("CAMERA" in FIG. 4) having the video recorder terminal 301 and the viewing user ("DISPLAY" in FIG. 4) having the viewer terminal 311.

Note that the operations meant by the phrase "manage the database" or the like used in the present Description involves creating, updating, and deleting a record, and obtaining objective data by performing computation related to relational algebra such as addition, subtraction, projection, selection, and so on.

Returning to FIG. 3, the following is a continuation of the description on the internal structure of the delivery server 210. The video recorder terminal managing unit 213 manages a video recorder terminal information database 500 shown in FIG. 5. The video recorder terminal information database 500 shows information of the video recorder terminal 301 that has logged in the live video delivery system. The video recorder terminal information database 500 is composed of a set of video recorder terminal records, which is created when the corresponding video recorder terminal 301 logs in the system, and is deleted when the corresponding video recorder terminal 301 logs out of the system. Each video recorder terminal record is composed of fields for a video recorder terminal ID, a user ID, a location information, a location update time, and a broadcast status.

The video recorder terminal ID field stores a video recorder terminal ID assigned to each video recorder terminal 301 at the time of the logging in. The video recorder terminal ID is used for identifying the video recorder terminal 301. Note that the same video recorder terminal is assigned the same video recorder terminal ID at the logging in. The user ID field stores the user ID used when the video recorder terminal 301 logged in the system. The location information field stores the current latitude and longitude of the video recorder terminal 301. The terminal location update time field stores the time of the last update of the location information field. The broadcast status field stores a status variable for managing the broadcast status of the video recorder terminal 301. The broadcast status of the video recorder terminal is one of the following three statuses: "BROADCASTING" indicating that the video recorder terminal is now transmitting a live video to the delivery server 210; "PREPARING" indicating that the video recorder terminal has accepted the notified request and is now preparing for recording a live video at the desired recording location; and "WAITING" indicating that the video recorder terminal is not engaging in the delivery or in the preparation.

Figure 6:
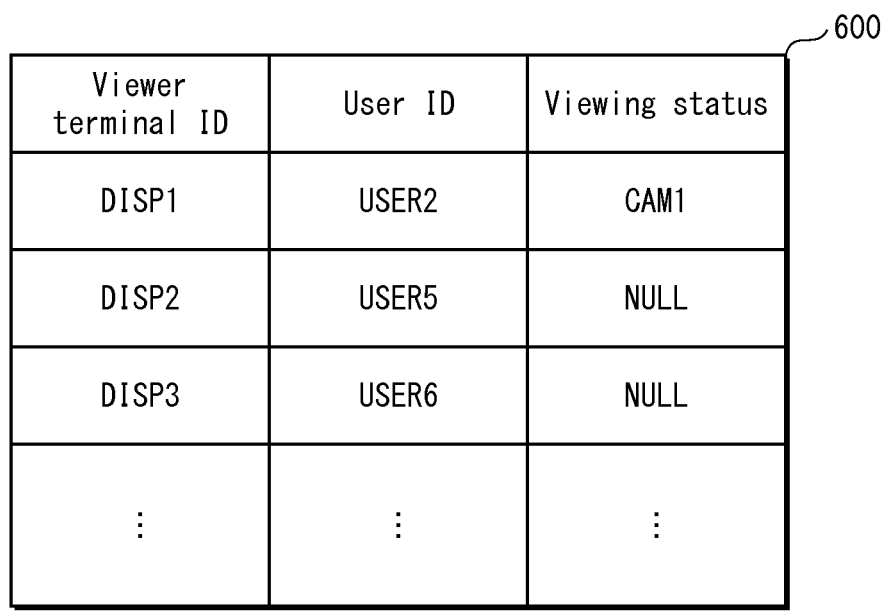
FIG. 6 shows a specific example of a viewer terminal information database pertaining to Embodiment 1 of the present invention.

Returning to FIG. 3, the following is a continuation of the description on the internal structure of the delivery server 210. The viewer terminal managing unit 214 manages a viewer terminal information database 600 shown in FIG. 6. The viewer terminal information database 600 shows information of the viewer terminal 311 that has logged in the live video delivery system. The viewer terminal information database 600 is composed of a set of viewer terminal records, which is created when the corresponding viewer terminal 311 logs in the system, and is deleted when the corresponding viewer terminal 311 logs out of the system. Each viewer terminal record is composed of fields for a viewer terminal ID, a user ID, and a viewing status.

The viewer terminal ID field stores a viewer terminal ID assigned to each viewer terminal 311 at the time of the logging in. The viewer terminal ID is used for identifying the viewer terminal 311. Note that the same viewer terminal is assigned the same viewer terminal ID at the logging in. The user ID field stores the user ID used when the viewer terminal 311 logged in the system. The viewing status field stores the video recorder terminal ID of the video recorder terminal 301 that is broadcasting the live video that the viewer terminal 311 is now viewing. Note that a null value is stored in this field when the viewer terminal 301 is not viewing the video.

Returning to FIG. 3, the following is a continuation of the description on the internal structure of the delivery server 210. The delivery video managing unit 215 manages the live video received from the video recorder terminal 301, in order to deliver the live video to the viewer terminal 311. Live videos are managed in association with the video recorder terminal IDs of the video recorder terminals 301 that records the videos. Therefore, by specifying the video recorder terminal ID, the delivery server 210 can deliver the live video recorded by any of the video recorder terminals 301 to the viewer terminal 311.

Figure 7:
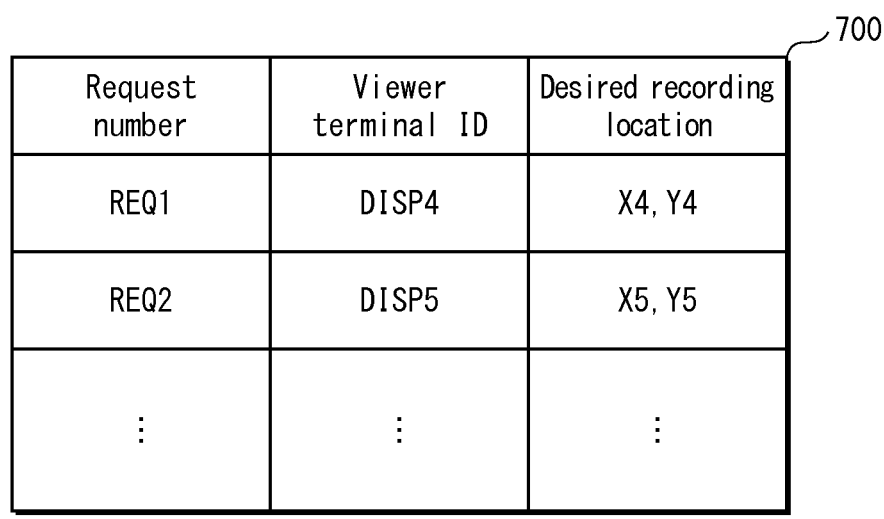
FIG. 7 shows a specific example of a delivery request information database pertaining to Embodiment 1 of the present invention.

The delivery request managing unit 216 manages a delivery request information database 700 shown in FIG. 7. The delivery request information database 700 is composed of a set of delivery request records showing information of the delivery request acquired by the request acquiring unit 203. Each delivery request record is composed of fields for a request number, a viewer terminal ID, and a desired recording location.

The request number field stores the request number assigned at the acquisition of the delivery request. The viewer terminal ID field stores the viewer terminal ID of the viewer terminal 311 that is the originator of the delivery request. The desired recording location field stores the desired location (i.e. the latitude and longitude) specified in the delivery request.

Returning to FIG. 3, the following is a continuation of the description on the internal structure of the delivery server 210. The delivery history managing unit 217 manages the history of video deliveries made in the past by the delivery server. FIG. 8 shows a specific example of the delivery history information database 800 managed by the delivery history managing unit 217. Each delivery history record is composed of fields for a delivery number, a user ID, a video recorder terminal ID, a delivery commencement time, a delivery termination time, and a request number.

The delivery number field stores a delivery number that is assigned at the time of the creation of the delivery history record. The user ID field stores the user ID of the video recorder terminal 301 that broadcasted a live video. The video recorder terminal ID field stores the video recorder terminal ID of the video recorder terminal 301 that broadcasted the live video. The delivery commencement time field stores the time when the video recorder terminal 301 started the transmission of the live video to the delivery server 210. The delivery termination time field stores the time when the video recorder terminal 301 ended the transmission of the live video to the delivery server 210. The request number field stores the request number of the delivery request when broadcasting of the live video was made in response to a delivery request, and stores a null value when broadcasting of the live video was made not in response to a delivery request, but was made according to the recording user's own free will.

Returning to FIG. 3, the following is a continuation of the description on the internal structure of the delivery server 210. The notification history managing unit 206 manages the history of the notifications of the delivery requests in the past made by the delivery server as shown in the overview. FIG. 9 shows a specific example of the notification history information database 900 under the management of the notification history managing unit 206. Each notification history record is composed of fields for a notification number, a user ID, a video recorder terminal ID, acceptance information, a location at the time of the request notification, a desired recording location, and a request notification time.

The notification number field stores a notification number that is assigned at the time of the creation of the notification history record. The user ID field stores the user ID of the video recorder terminal 301 that received the notification. The video recorder terminal ID field stores the video recorder terminal ID of the video recorder terminal 301 that received the notification. The field for the location at the time of the notification stores the location information of the video recorder terminal 301 that received the notification, at the time the notification was provided. The desired recording location field stores the desired recording location specified in the notified delivery request. The acceptance information field stores acceptance information indicating the response from the video recorder terminal 301 corresponding to the notified delivery request. The request notification time field stores information indicating the date and time of the notification of the delivery request.

The delivery server 210 thus records, as the history, two kinds of location information, namely the location at the time of the notification and the desired recording location, and the acceptance information. The delivery server 210 can thereby determine the degree of the tendency to accept the request for each video recorder terminal 301 in association with the distance from the location at the time of the notification to the desired recording location.

Returning to FIG. 3, the following is a continuation of the description on the internal structure of the delivery server 210. The video recorder terminal searching unit 217 searches for the video recorder terminal 301 in response to a search request from the viewer terminal 311. Specifically, the video recorder terminal searching unit 218 acquires search conditions from the viewer terminal 311, and acquires the video recorder terminal record that satisfy the acquired search conditions and has the broadcast status "BROADCASTING" or "PREPARING".

The search conditions specify a geographical range. Specifically, the search conditions specify the latitude and longitude of the central point, and the radius. The video recorder terminal 301 that satisfy the search conditions is the video recorder terminal 301 that exists within the geographical range specified by the search conditions. The video recorder terminal searching unit 218 determines whether the search conditions are satisfied or not by calculating the distance between the location indicated by each video recorder terminal record in the video recorder terminal information database 500 and the location of the central point indicated by the search conditions, and comparing the distance with the radius indicated by the search conditions.

Figure 10:
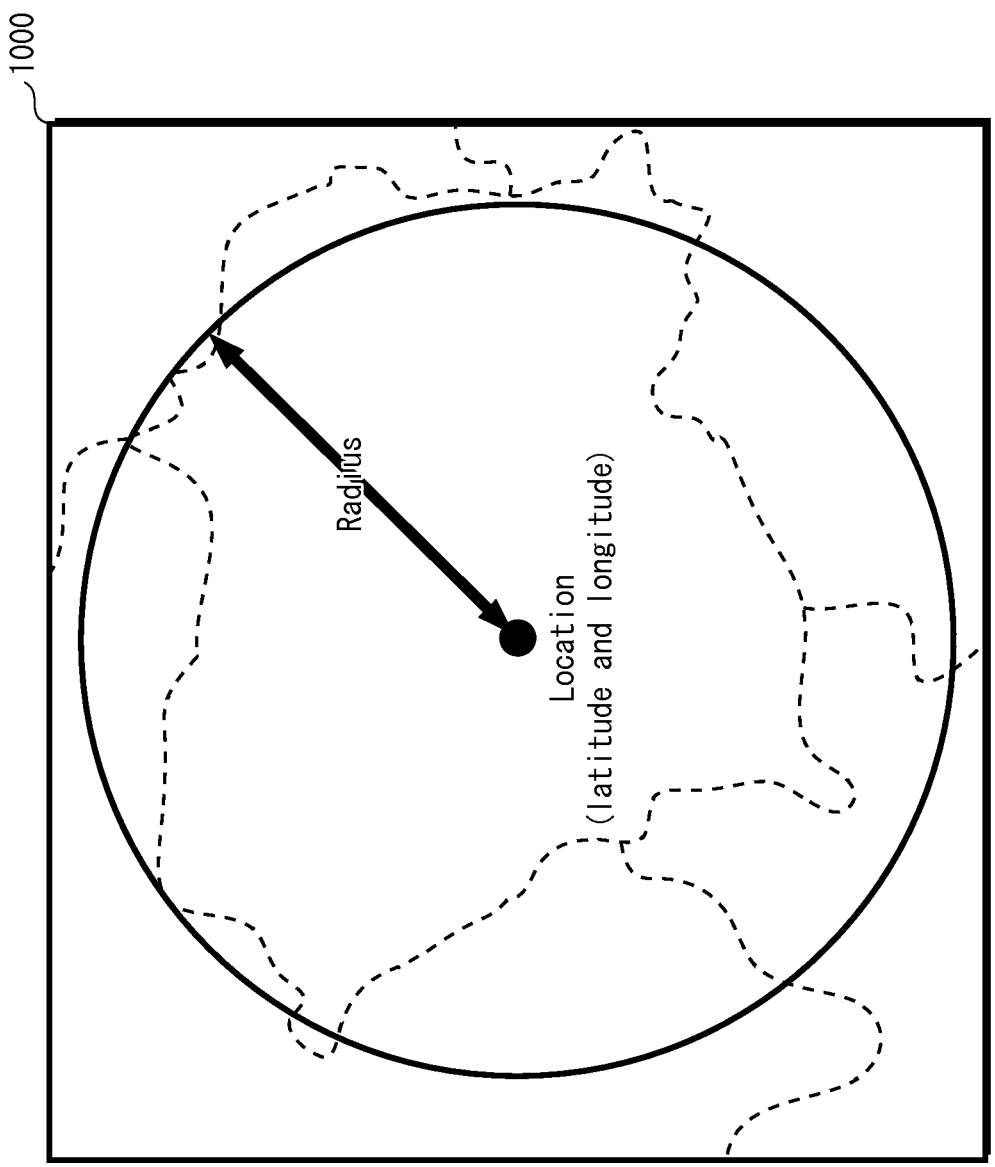
FIG. 10 shows an example of a user interface of the viewer terminal specifying search conditions pertaining to Embodiment 1 of the present invention.

Note that the search conditions are specified from a user interface of the viewer terminal 311. Examples of the user interface of the viewer terminal 311 for specifying the search conditions include: an interface for receiving numerical values representing the latitude, the longitude and the radius; and an interface showing a map on the screen of the viewer terminal 311 as shown in FIG. 10 in response to a user instruction, and receiving a specification of the location (i.e. latitude and longitude) and the radius within the range of the map. When the viewer terminal 311 displays such a map, it is preferable that landmark icons showing stations, railroad maps, famous buildings are overlaid on the map to enable the viewing user to more intuitively specify the search conditions.

Furthermore, the viewing user may be allowed to input the address or the information that specifies the location as instructed by the user interface of the viewer terminal 311, and the viewer terminal 311 may convert the information into the latitude and the longitude. The information that specifies the location is the information that uniquely specifies the latitude and the longitude of the recording location, such as "the entrance gate of the amusement park A" and "the plaza in front of the station B". As another embodiment, the delivery server 210 may include a converter for converting the address or the information specifying the location to the location (i.e. latitude and longitude), and the delivery server 210 may perform the conversion.

Returning to FIG. 3, the following is a continuation of the description on the internal structure of the delivery server 210. The terminal list notifying unit 219 has the functions of: creating a video recorder terminal list from the results of the search performed by the searching unit 218, and providing the viewer terminal 311 with the video recorder terminal list thus created; and creating a video recorder terminal list showing the video recorder terminals that received the delivery request, and providing the viewer terminal 311 that is the request originator with the video recorder terminal list thus created.

Figure 11:
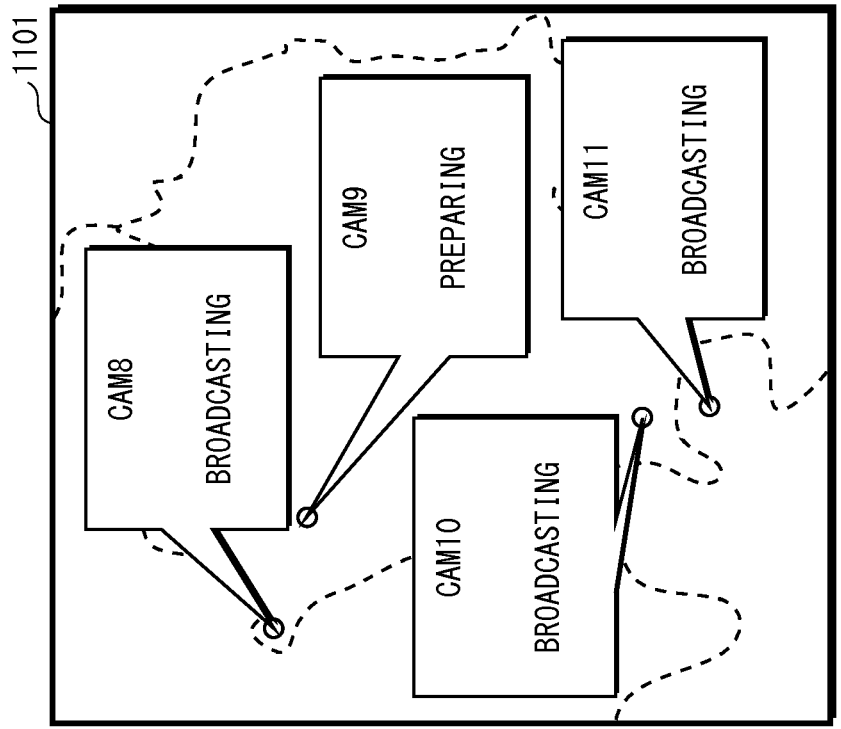
FIGS. 11A and 11B show examples of a user interface of the viewer terminal showing a list of video recorder terminals pertaining to Embodiment 1 of the present invention.

The video recorder terminal list contains the video recorder terminal ID, the location information and the broadcast status for each video recorder terminal in the list. The video recorder terminal list is transmitted to the viewer terminal 311. The video recorder terminal list transmitted to the viewer terminal 311 is provided to the viewing user via the user interface of the viewer terminal 311. Examples of the user interface of the viewer terminal include: a simple presentation of the list as shown in FIG. 11A; and the presentation of information overlaid on the map as shown in FIG. 11B. Also, the terminal list notifying unit 219 may transmit snapshot images of the live video that is being broadcasted by each video recorder terminal 301 or a compressed version of the live video with a greatly reduced data amount due to a reduced display resolution (i.e. the number of pixels) to the viewer terminal 311 in addition to the video recorder terminal list. If this is the case, the viewer terminal 311 can display them together with the video recorder terminal list, and the viewing user can acquire more information from the video recorder terminal list.

Returning to FIG. 3, the following is a continuation of the description on the internal structure of the delivery server 210. The video receiving/transmitting unit 220 has the functions of: receiving the live video from the video recorder terminals 301; and delivering the live video to the viewer terminals 311.

The request acquiring unit 201 acquires the delivery request including the desired recording location specified by the viewing user from the viewer terminal 311. The delivery request managing unit 216 creates a delivery request record based on the delivery request acquired by the request acquiring unit 201, and adds the record to the delivery request information database 700.

The desired recording location is specified by the viewing user from the user interface of the viewer terminal 311. Like the user interface for specifying the search conditions, examples of the user interface of the viewer terminal 311 for specifying the desired recording location include: an interface for receiving numerical values representing the latitude and the longitude; an interface showing a map on the screen of the viewer terminal 311 in response to a user instruction, and receiving a specification of the location (i.e. latitude and longitude) within the range of the map; and an interface for converting an input address or the like to the location.

The terminal location acquiring unit 202 acquires the current location information of the video recorder terminal 301. The terminal location acquiring unit 202 periodically acquires the current location information of the video recorder terminal 301. The video recorder terminal managing unit 213 updates the video recorder terminal information database 500 according to the location information acquired by the terminal location acquiring unit 202. Note that each video recorder terminal 301 holds information of its own location obtained by positioning using GPS or information from a base station for portable telephones.

The request notification terminal selecting unit 203 selects video recorder terminals 301 to be provided with a notification of the delivery request. The processing for selecting the delivery request will be described later in detail.

The request notifying unit 204 provides a notification to the video recorder terminals 301 selected by the request notification terminal selecting unit 203. Note that the delivery request received from the viewer terminal 311 and the delivery request to be transmitted to the video recorder terminals 301 necessarily coincide in terms of the desired recording location, but except for the desired recording location, some of the information contained in one of the delivery request may be not contained in the other.

The acceptance information acquiring unit 205 acquires the acceptance information related to the notified delivery request.

The notification history managing unit 206 updates the notification history information database 900 according to the acceptance information acquired by the acceptance information acquiring unit 205.

The control unit 220 controls each of the functional elements in order to achieve the functions described above.

2-2. Operations

The following describes specific operations of the live video delivery system with reference to the drawings.

The live video delivery system pertaining to the present embodiment has two approaches for enabling the delivery server 210 to deliver the live video recorded by the video recorder terminal 301 to the viewer terminal 311. One is to deliver, to the viewer terminal 311, the live video selected by the viewer terminal 311 from among the live videos already being broadcasted, and the other is to deliver, to the viewer terminal 311, the live video recorded by the video recorder terminal 301 in response to a request from the viewer terminal 311.

2-2-1. Processing 1 for Starting the Delivery of the Live Video

Figure 12:
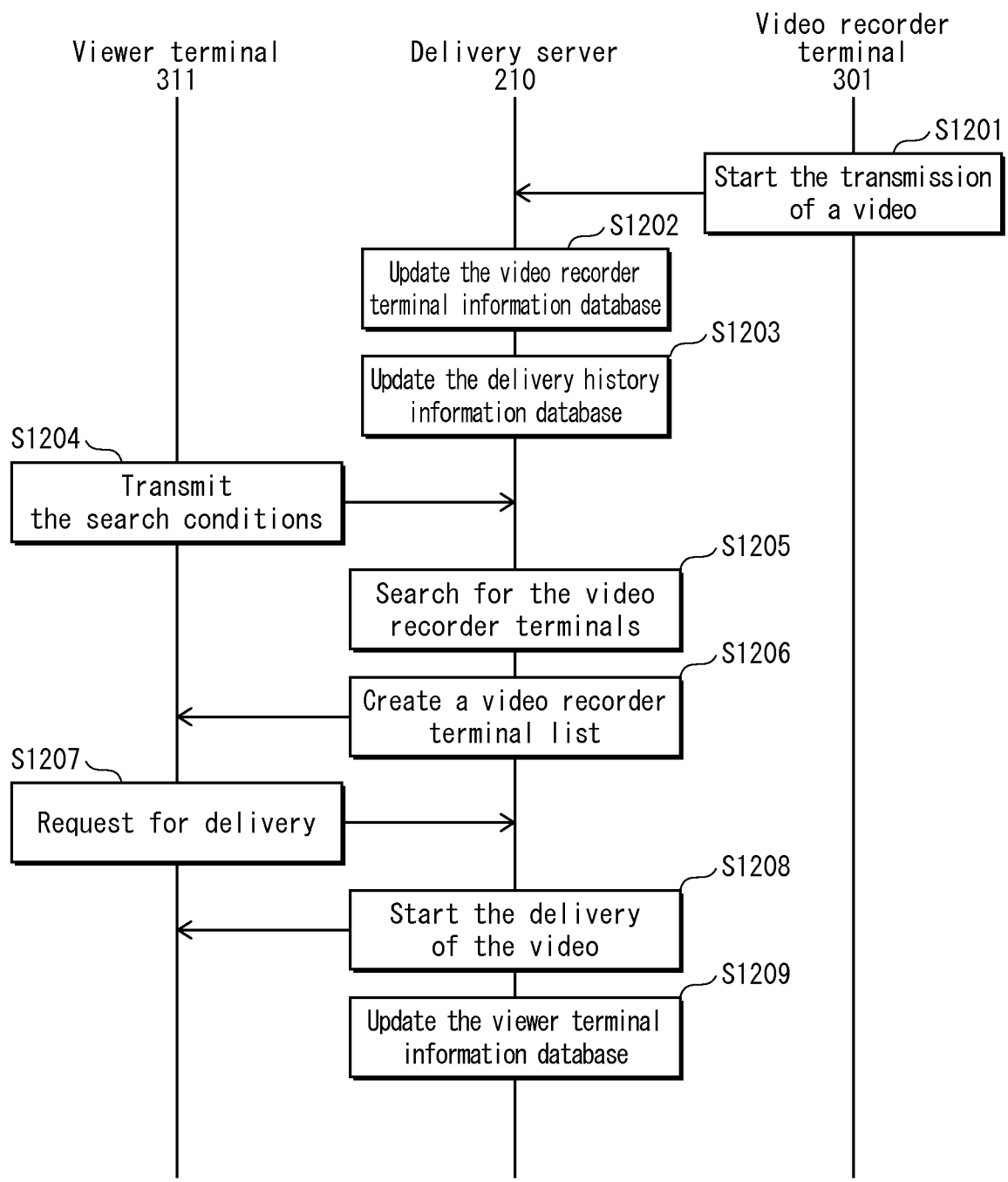
FIG. 12 is a sequence diagram pertaining to Embodiment 1 of the present invention, showing operations of the viewer terminal, the delivery server and the video recorder terminal performed when the delivery server delivers a live video, selected by the viewer terminal from among live videos already being broadcasted, to the viewer terminal.

FIG. 12 shows the operations of the viewer terminal 311, the delivery server 210 and the video recorder terminal 301 performed when the delivery server 210 delivers the live video, selected by the viewer terminal 311 from among live videos already being broadcasted, to the viewer terminal 311.

First, the video recorder terminal 301 starts recording at the current location of the video recorder terminal 301 in response to an instruction of the recording user. Simultaneously with starting the recording, the video recorder terminal 301 provides the delivery server with a notification of starting the transmission of the live video, and starts transmitting the live video to the delivery server 210 (S1201).

Upon receipt of the notification of the commencement of the video transmission from the video recorder terminal 301, the video recorder terminal managing unit 213 of the delivery server 210 updates the video recorder terminal information database 500 (S1202). Specifically, the video recorder terminal managing unit 213 updates the broadcast status field of the corresponding video recorder terminal broadcast record from "WAITING" to "BROADCASTING".

Upon receipt of the notification of the commencement of the video transmission from the video recorder terminal 301, the delivery history managing unit 217 of the delivery server 210 creates a delivery history record according to the information of the live video to be newly broadcasted, and adds the record to the delivery history information database 800 (S1203). In the delivery history record created at this point, the fields for the delivery number, the user ID, the video recorder terminal ID and the delivery commencement time are respectively filled with the delivery number that is automatically assigned, the user ID of the video recorder terminal that transmitted the live video, the video recorder terminal ID, and the current time. The fields for the delivery termination time and the request number are filled with a null value.

Although not depicted in the drawing, the video receiving/transmitting unit 220 of the delivery server 210 receives the live video in a stream format transmitted by the video recorder terminal 301, and the delivery video managing unit 215 manages the live video in association with the video recorder terminal ID.

Independently from the operations of the video recorder terminal 301, the viewer terminal 311 transmits search conditions to the delivery server 210 in response to an instruction from the viewing user (S1204).

Upon receipt of the search conditions from the viewer terminal 311, the video recorder terminal searching unit 218 of the delivery server 210 searches for the video recorder terminals 301 that satisfy the search conditions and that are broadcasting or preparing for broadcasting the live video (S1205).

Upon completion of the search for the video recorder terminals 301, the terminal list notifying unit 219 creates a video recorder terminal list according to the search results, and transmits the video recorder terminal list to the viewer terminal 311 (S1206).

The viewer terminal 311 selects one of the video recorder terminals 301 from the received video recorder terminal list, and transmits, to the delivery server 210, a request for delivery of the live video that is being recorded by the selected video recorder terminal 301 (S1207).

Upon receipt of the delivery request from the viewer terminal 311, the video receiving/transmitting unit 220 of the delivery server 210 transmits, to the viewer terminal 311, the live video specified from among the live videos that are under the management of the delivery video managing unit 215 (S1208). Then, the viewer terminal 311 starts playing the live video that is being delivered.

Upon receipt of the delivery request from the viewer terminal 311, the viewer terminal managing unit 214 of the delivery server 210 updates the viewing status field of the corresponding viewer terminal record in the viewer terminal information database 600 according to the received delivery request (S1209).

By performing the operations shown in FIG. 12, the delivery server 210 delivers, to the viewer terminal 311, the live video already being broadcasted.

2-2-2. Processing 2 for Starting the Delivery of the Live Video

Figure 13:
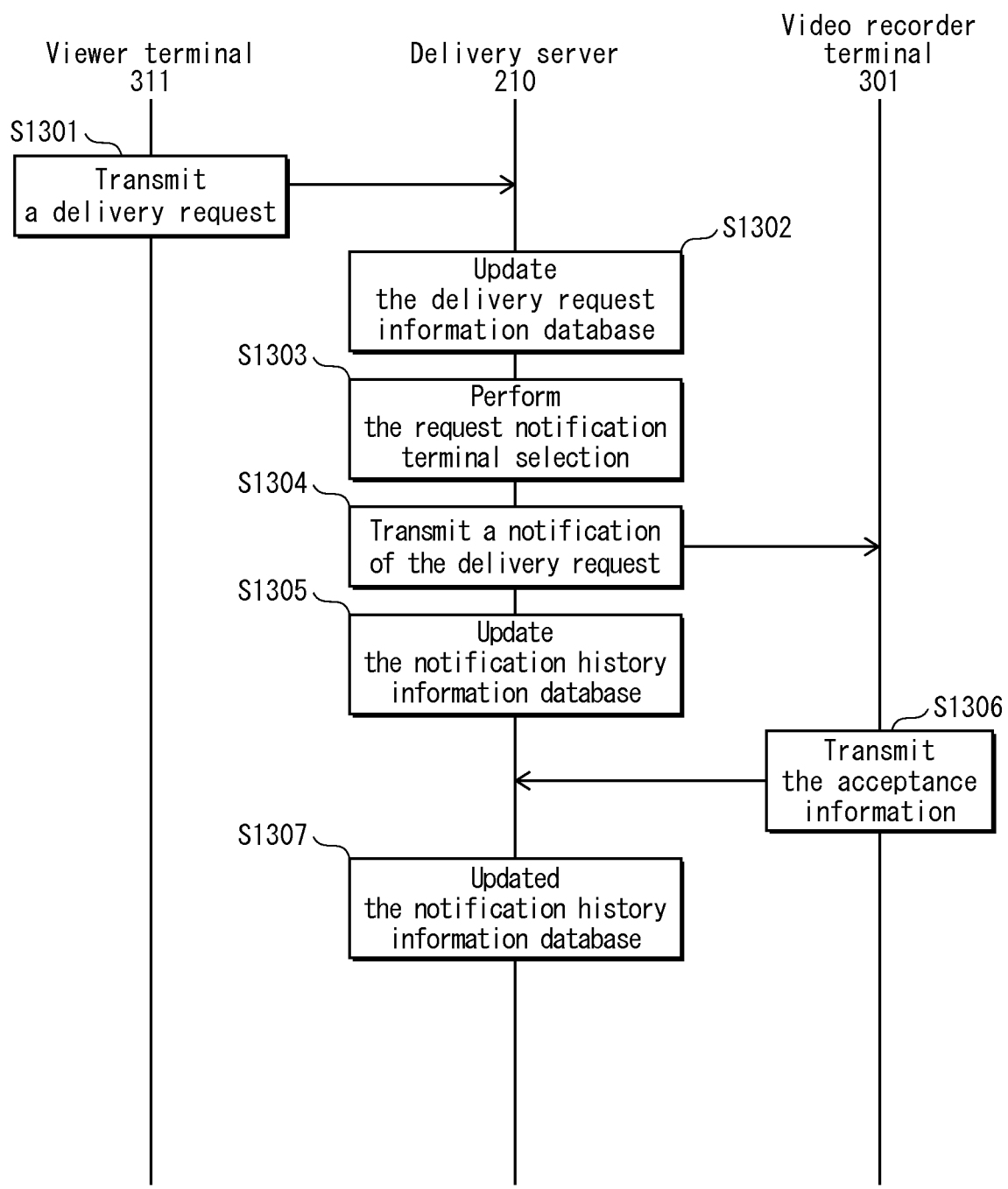
FIG. 13 is a sequence diagram pertaining to Embodiment 1 of the present invention, showing operations of the viewer terminal, the delivery server and the video recorder terminal performed when the delivery server delivers a live video, recorded by the video recorder terminal in response to a request from the viewer terminal, to the viewer terminal.
Figure 14:
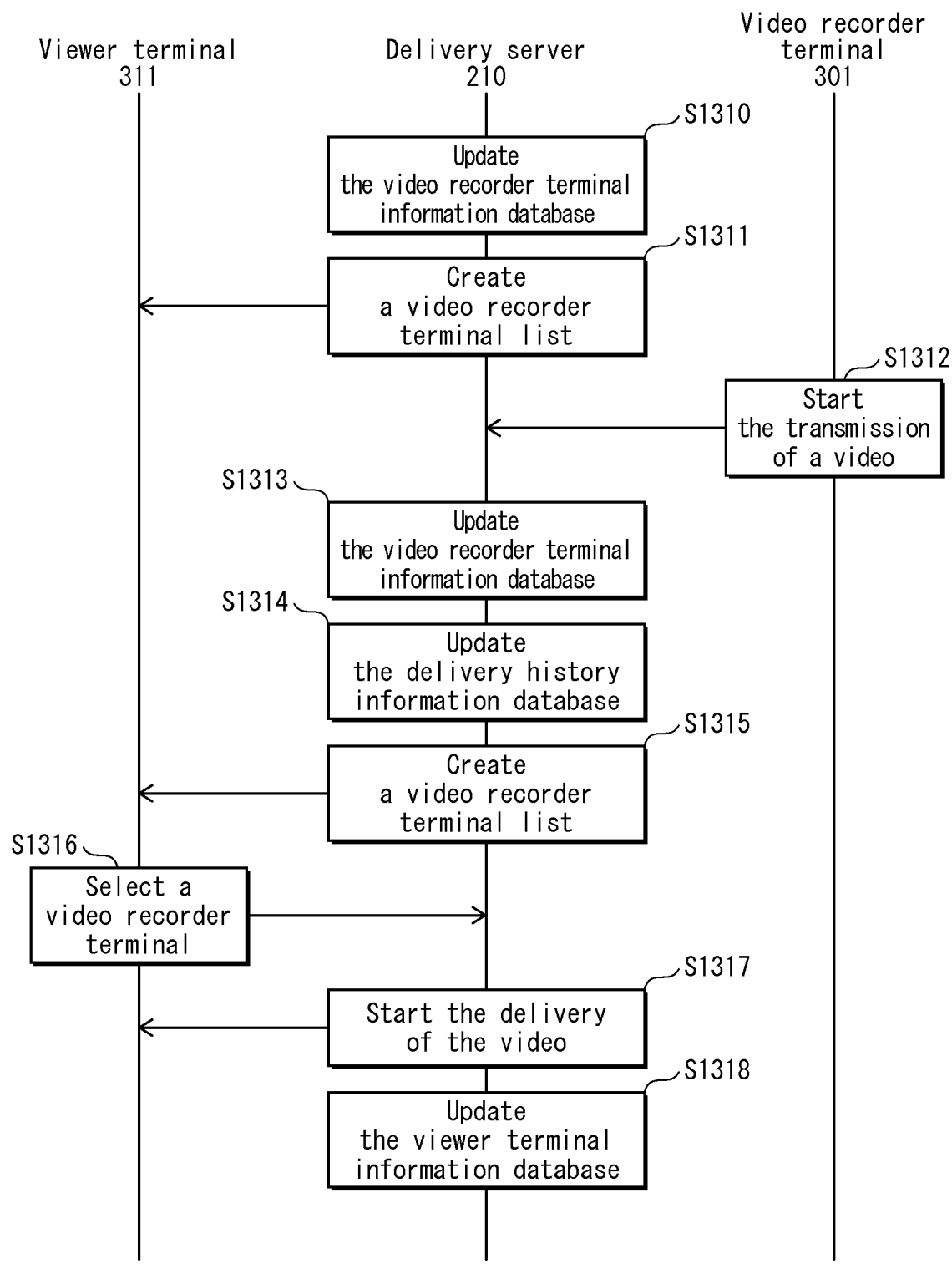
FIG. 14 is a sequence diagram pertaining to Embodiment 1 of the present invention, showing operations of the viewer terminal, the delivery server and the video recorder terminal performed when the delivery server delivers a live video, recorded by the video recorder terminal in response to a request from the viewer terminal, to the viewer terminal.

Referring to FIG. 13 and FIG. 14, the following describes the operations of the viewer terminal 311, the delivery server 210 and the video recorder terminal 301 performed when the delivery server 210 delivers, to the viewer terminal 311, the live video recorded by the video recorder terminal 301 in response to the request from the viewer terminal 311.

First, the viewer terminal 311 transmits the delivery request to the delivery server 210 according to an instruction from the viewing user (S1301).

Upon receipt of the delivery request from the viewer terminal 311, the delivery request managing unit 216 of the delivery server 210 creates a delivery request record according to the delivery request, and adds the record to the delivery request information database 700 (S1302).

Upon the completion of the update of the delivery request information database 700, the request notification terminal selecting unit 203 of the delivery server 210 performs request notification terminal selection, which will be described later, so as to select the video recorder terminal 301 that is likely to accept the delivery request from the viewing user (S1303).

Note the number of the video recorder terminals selected at a time during the request notification terminal selection by the request notification terminal selecting unit 203 is 0 or more. Although not depicted in the drawing, when no video recorder terminal 301 is selected, the delivery server 210 notifies the viewer terminal 311 of that no terminal has accepted the delivery request, and terminates the processing.

The request notifying unit 203 of the delivery server 210 provides the selected video recorder terminal 301 with a notification of the delivery request (S1304).

Every time the request notifying unit 203 provides the video recorder terminal 301 with a notification of a delivery request, the notification history managing unit 206 creates a notification history record according to the information of the delivery request and the video recorder terminal 301 receiving the notification, and adds the record to the notification history information database 900 (S1305).

The video recorder terminal 301 that has been provided with the notification of the delivery request transmits, to the delivery server 210, acceptance information indicating whether or not to accept the delivery request (S1306).

Upon receipt of the acceptance information from the video recorder terminal 301, the notification history managing unit 206 of the delivery server 210 updates the corresponding notification history record in the notification history information database 900 according to the acceptance information (S1307).

The video recorder terminals that have not responded to the request within a predetermined period are determined as terminals that have rejected the request. When no video recorder terminal 301 accept the request, the request notification terminal selecting unit 203 returns to Step S1303 and performs the selection from the video recorder terminals again, excluding the video recorder terminals to which the notification of the delivery request have already been transmitted.

Upon receiving the acceptance information indicating the acceptance of the request from the video recorder terminal 301, the video recorder terminal managing unit 213 of the delivery server 210 updates the broadcast status field of the corresponding video recorder terminal record in the video recorder terminal information database 500 to "PREPARING" (S1310).

Upon completion of the update of the video recorder terminal information database 500, the terminal list notifying unit 219 of the delivery server 210 creates a terminal list showing the video recorder terminals 301 that have accepted the delivery request, and provides the viewer terminal 311 with a notification showing the video recorder terminals 301 that have accepted the delivery request (S1311). By receiving the notification, the viewer terminal 311 is informed of that some of the video recorder terminals 301 have accepted the request.

The video recorder terminal 301 that has accepted the delivery request travels to the desired recording location specified in the delivery request, and starts recording. Simultaneously with starting the recording, the video recorder terminal 301 provides the delivery server with a notification of the commencement of the transmission of the live video, and starts transmitting the live video to the delivery server 210 (S1312).

Upon receipt of the notification indicating the commencement of the video transmission, the video recorder terminal managing unit 213 of the delivery server 210 updates the broadcast status field of the corresponding video recorder terminal record in the video recorder terminal information database 500 from "PREPARING" to "BROADCASTING" (S1313).

Upon receipt of the notification of the commencement of the video transmission from the video recorder terminal 301, the delivery history managing unit 217 of the delivery server 210 creates a delivery history record according to the information of the live video to be newly broadcasted, and adds the record to the delivery history information database 800 (S1314). In the delivery history record thus created, the fields for the delivery number, the user ID, the video recorder terminal ID, the delivery commencement time, and the request number are respectively filled with the delivery number that is automatically assigned, the user ID of the video recorder terminal that transmitted the live video, the video recorder terminal ID, the current time, and the corresponding request number. The field for the delivery termination time is filled with a null value.

Although not depicted in the drawing, the video receiving/transmitting unit 220 of the delivery server 210 receives the live video in a stream format transmitted by the video recorder terminal 301, and the delivery video managing unit 215 manages the live video in association with the video recorder terminal ID.

Upon completion of the update of the video recorder terminal information database 500, the terminal list notifying unit 219 of the delivery server 210 creates a terminal list showing the video recorder terminals 301 that have accepted the delivery request, and provides the viewer terminal 311 with a notification (S1315). By receiving the notification, the viewer terminal 311 is informed of that the video recorder terminals 301 that have accepted the request have started broadcasting the live video.

The viewer terminal 311 selects the video recorder terminal 301 from the received video recorder terminal list, and transmits, to the delivery server 210, a request for delivery of the live video that is being recorded by the selected video recorder terminal 301 (S1316).

Upon receipt of the delivery request from the viewer terminal 311, the video receiving/transmitting unit 220 of the delivery server 210 transmits, to the viewer terminal 311, the live video specified from among the live videos under the management of the delivery video managing unit 215 (S1317).

Upon receiving the delivery request from the viewer terminal 311, the viewer terminal managing unit 214 of the delivery server 210 updates the viewing status field of the corresponding viewer terminal record in the viewer terminal information database 600 according to the received delivery request (S1318).

The viewer terminal 311 starts playing the delivered live video.

By performing the operations shown in FIG. 13 and FIG. 14, the delivery server 210 delivers, to the viewer terminal 311, the live video being recorded by the video recorder terminal 301 in response to the request from the viewer terminal 311.

Next, a description is given to operations performed by the delivery server 210 to terminate the delivery of the live video to the viewer terminal 311, taking two cases into consideration. One is the case where the delivery of the live video is terminated in response to an operation of the viewer terminal, and the other is the case where the delivery of the live video is terminated in response to an operation of the video recorder terminal

2-2-3. Processing 1 for Terminating the Delivery of the Live Video

Figure 15:
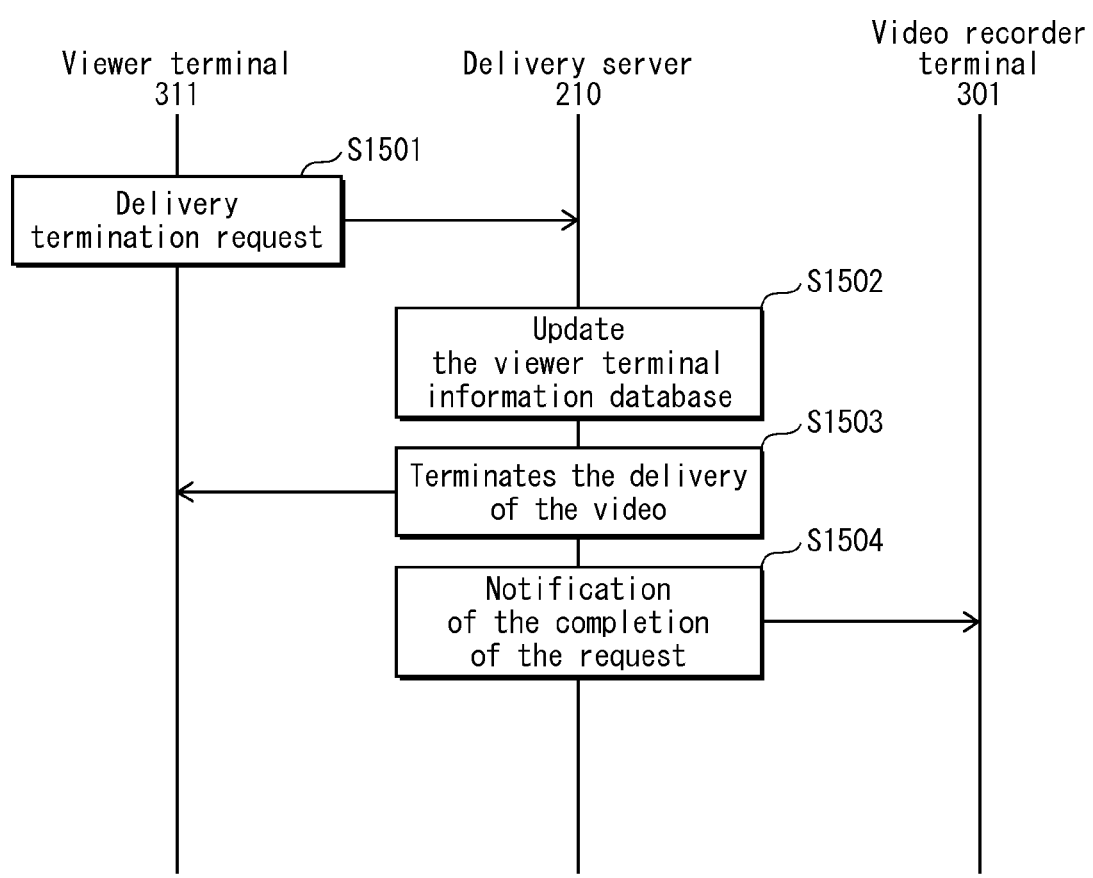
FIG. 15 is a sequence diagram pertaining to Embodiment 1 of the present invention, showing operations of the viewer terminal and the delivery server performed when the delivery server terminates the delivery of the live video in response to an operation of the viewer terminal.

FIG. 15 shows the operations of the viewer terminal 311 and the delivery server 210 performed when the delivery server 210 terminates the delivery of the live video in response to an operation of the viewer terminal 311.

First, the viewer terminal 311 stops playing back the live video, and transmits, to the delivery server 210, a delivery termination request for termination of the delivery of the live video (S1501).

Upon receiving the delivery termination request from the viewer terminal 311, the viewer terminal managing unit 214 of the delivery server 210 updates the viewing status field of the corresponding viewer terminal record in the viewer terminal information database 600 according to the delivery termination request (S1502).

Upon receipt of the delivery termination request from the viewer terminal 311, the video receiving/transmitting unit 220 of the delivery server 210 terminates the delivery of the live video to the viewer terminal 311 according to the delivery termination request (S1503).

The delivery server 210 determines whether or not the delivery of the live video which has been terminated was requested for by the viewer terminal that has made the delivery termination request, referring to the delivery history information database 800 that is under the management of the delivery history managing unit 217 and the delivery request information database 700 that is under the management of the delivery request managing unit 216. When the delivery of the live video was requested for by the viewer terminal that has made the delivery termination request, the delivery server 210 provides the video recorder terminal 301 with a notification indicating that the viewer terminal 311 as the requester of the live video has terminated the viewing of the live video, i.e. the request has been completed (S1504).

By performing the operations shown in FIG. 15, the delivery server 210 terminates the delivery of the live video to the viewer terminal 311.

2-2-4. Processing 2 for Terminating the Delivery of the Live Video

Figure 16:
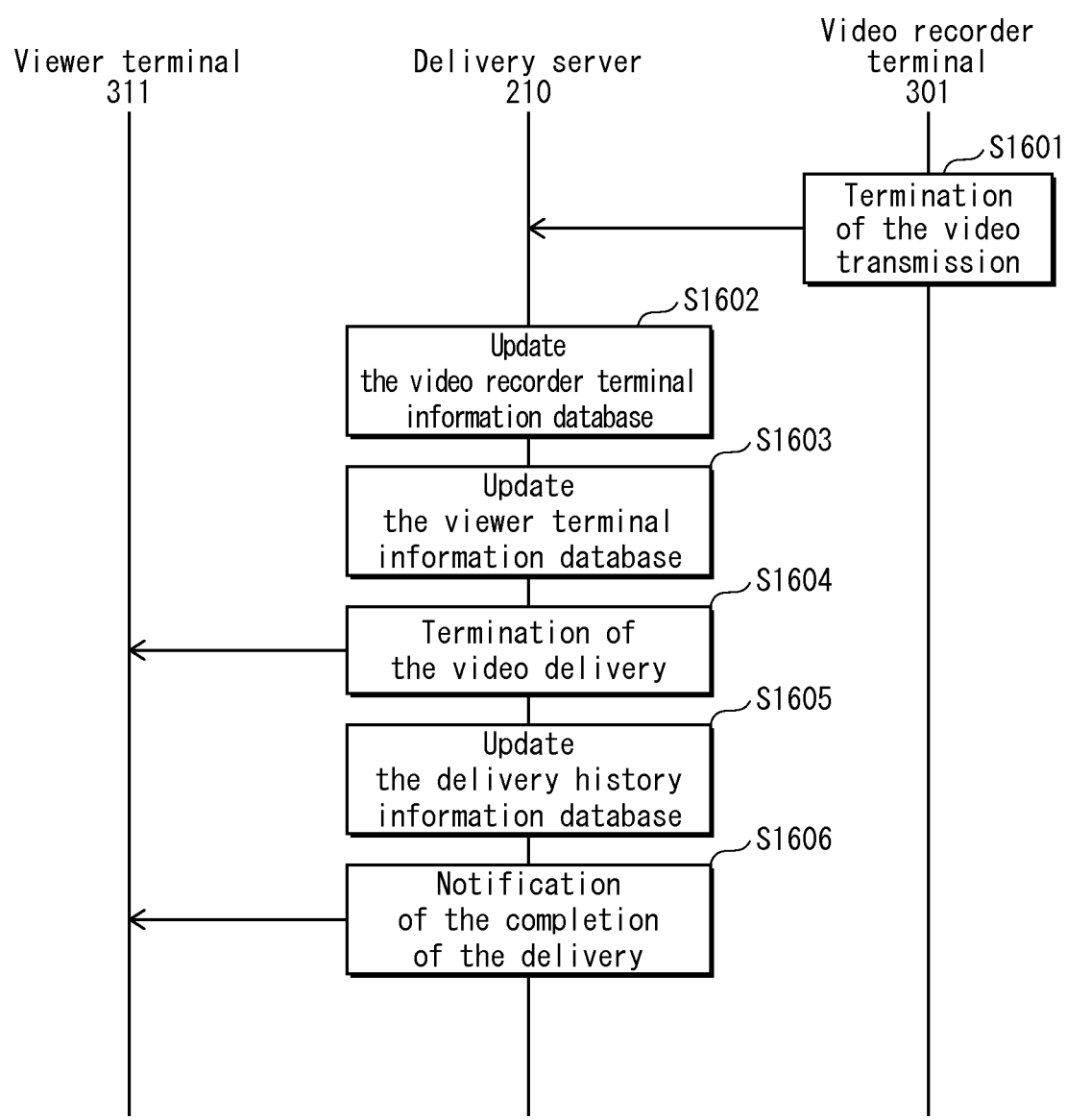
FIG. 16 is a sequence diagram pertaining to Embodiment 1 of the present invention, showing operations of the viewer terminal, the delivery server and the video recorder terminal performed when the delivery server terminates the delivery of the live video in response to an operation of the video recorder terminal.

FIG. 16 shows the operations of the viewer terminal, the delivery server 210 and the video recorder terminal performed when the delivery server 210 terminates the delivery of the live video in response to an operation of the video recorder terminal 301.

First, the video recorder terminal 301 provides the delivery server 210 with a notification of the termination of the transmission of the live video, and then terminates the transmission of the live video to the delivery server 210 (S1601).

Upon receipt of the notification of the transmission of the live video from the video recorder terminal 301, the video recorder terminal managing unit 213 of the delivery server 210 updates the broadcast status field of the corresponding video recorder terminal record in the video recorder terminal information database 500 from "BROADCASTING" to "WAITING" (S1602).

Upon receipt of the notification of the transmission of the live video from the video recorder terminal 301, the viewer terminal managing unit 214 of the delivery server 210 searches the viewer terminal information database 600 for the viewer terminal record of the viewer terminal that is viewing the live video from the corresponding video recorder terminal, and updates the viewing status field (S1603).

Furthermore, upon receipt of the notification of the transmission of the live video from the video recorder terminal 301, the viewer terminal managing unit 214 of the delivery server 210 provides the viewer terminal 311 that has updated the viewing status with a notification of the termination of the delivery of the live video, and then terminates the delivery to the viewer terminal 311 (S1604).

The delivery history managing unit 217 of the delivery server 210 fills the delivery termination time field of the corresponding record in the delivery history information database 800 with the current time (S1605).

The delivery server 210 determines whether or not the delivery of the live video which has been terminated was requested for by the viewer terminal 311, referring to the request number field in the delivery history information database 800. When the delivery of the live video which has been terminated was requested for by the viewer terminal 311, the delivery server 210 provides the viewer terminal 311 that made the corresponding request with a notification of the termination of the delivery of the live video recorded by the video recorder terminal 301 that accepted the delivery request (S1606).

By performing the operations shown in FIG. 16, the delivery server 210 terminates the delivery of the live video to the viewer terminal 311.

2-2-5. Request Notification Terminal Selection

Figure 17:
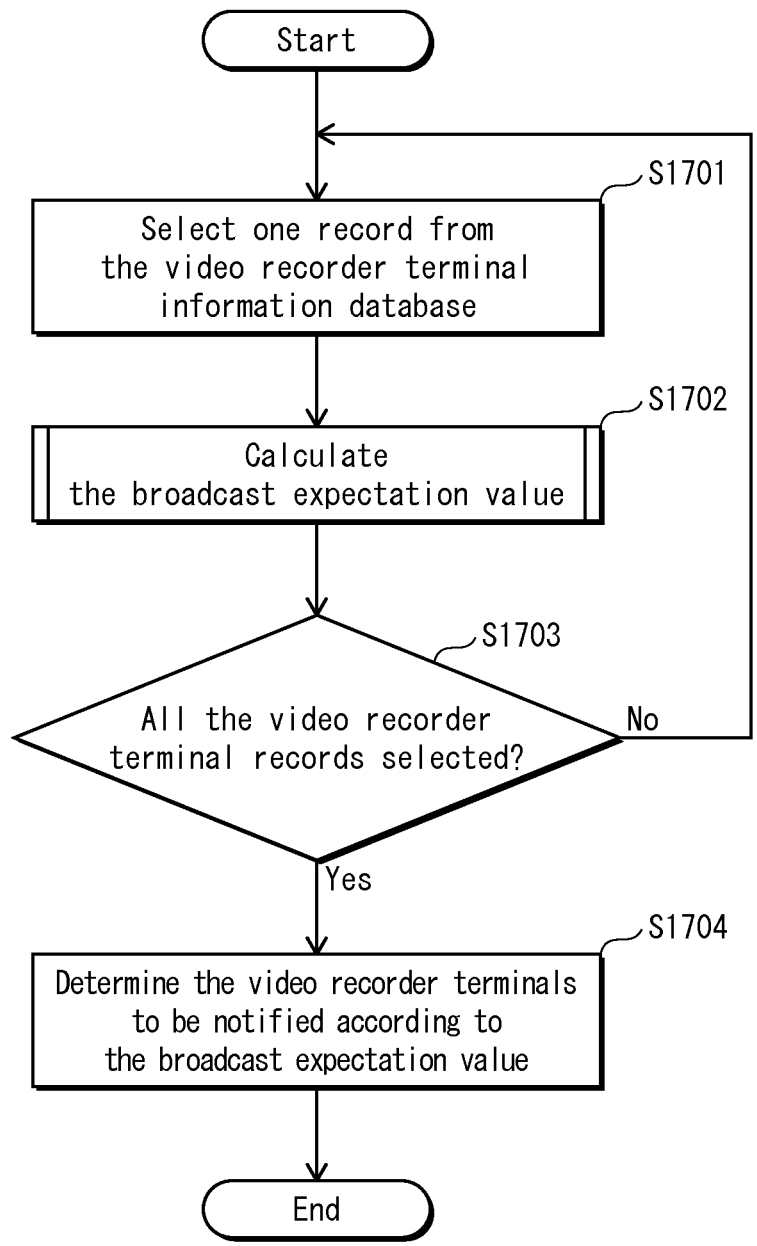
FIG. 17 is a flowchart pertaining to Embodiment 1 of the present invention, for selecting the video recorder terminal to be provided with a notification of the delivery request.

Next, the following provides a detailed description of the processing performed in Step S1303 for selecting the video recorder terminal 301 that is to be provided with the delivery request, with reference to the drawings. FIG. 17 is a flowchart of the processing performed by the request notification terminal selecting unit 203 of the delivery server 210 for selecting the video recorder terminal to be provided with the delivery request.

At the beginning of the processing, the request notification terminal selecting unit 203 selects one of the video recorder terminal records in the video recorder terminal information database 500 that is under the management of the video recorder terminal managing unit 213 (S1701).

The request notification terminal selecting unit 203 performs the broadcast expectation value calculation, which will be described later, to calculate the broadcast expectation value of the selected video recorder terminal 301 (S1702).

The request notification terminal selecting unit 203 determines whether or not all the video recorder terminal records in the video recorder terminal information database 500 have been selected in Step S1701 (S1703). When all the video recorder terminal records have been selected (S1703: Yes), the request notification terminal selecting unit 203 moves to Step S1704. If any of the video recorder terminal records remain unselected (S1703: No), the request notification terminal selecting unit 203 returns to Step S1701.

The request notification terminal selecting unit 203 selects, from among the video recorder terminals with the broadcast expectation value greater than a predetermined value (e.g. 0.2), a predetermined number (e.g. 10) of the video recorder terminals at a time as the video recorder terminals to be notified of the delivery request, in the order of the decreasing broadcast expectation values (S1704).

2-2-6. Calculation of Broadcast Expectation Value of Video Recorder Terminals

Figure 18:
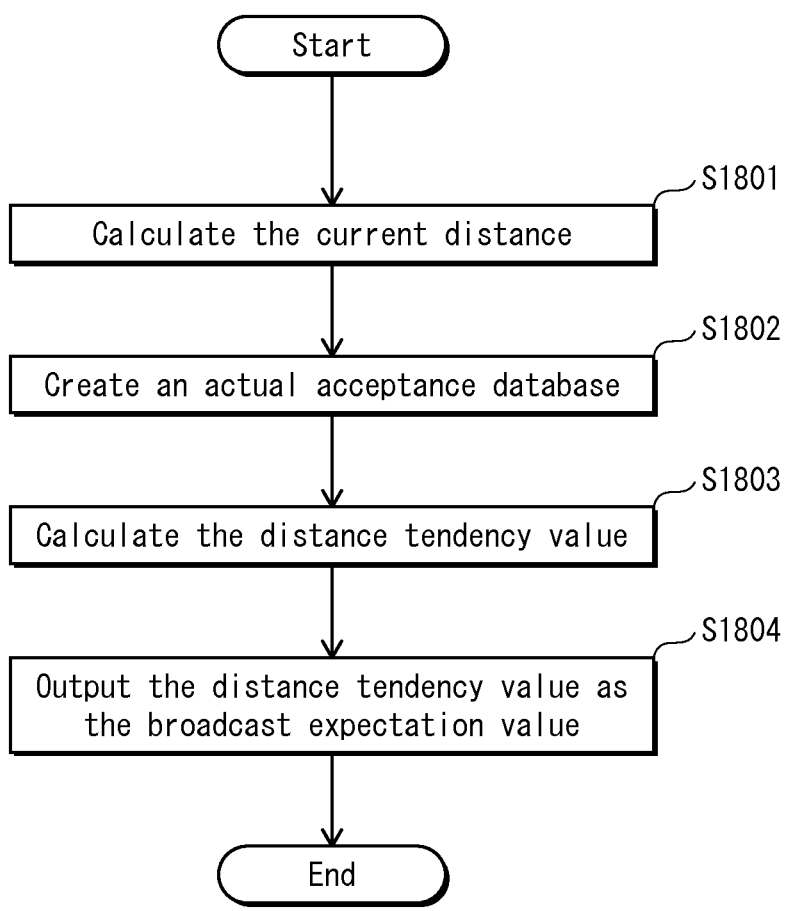
FIG. 18 is a flowchart pertaining to Embodiment 1 of the present invention, for calculating a broadcast expectation value of a target terminal.

FIG. 18 is a flowchart showing the details of the processing performed in Step S1702 for calculating the broadcast expectation value of the video recorder terminal 301. Note that the video recorder terminal whose broadcast expectation value is to be calculated is referred to as "the target terminal", and the delivery request to be notified of is referred to as "the target request".

First, the request notification terminal selecting unit 203 calculates a current distance showing the distance between the current location of the target terminal and the desired recording location indicated by the target request (S1801). The current location of the target terminal is acquired from the location information field of the video recorder terminal record of the target terminal in the video recorder terminal information database 500 that is under the management of the video recorder terminal managing unit 213. The desired recording location indicated by the target request is acquired from the desired recording location field of the delivery request record of the target request in the delivery request information database 700 that is under the management of the delivery request managing unit 216.

Next, the request notification terminal selecting unit 203 creates an actual acceptance database 1900 which shows the history of the acceptance of the requests notified to the target terminals in the past (S1802). Specifically, the actual acceptance database 1900 shows the relationship between the distance from the target terminal to the desired recording location at the time the notification was provided and the acceptance information of the target terminal corresponding to the notification.

Figure 19:
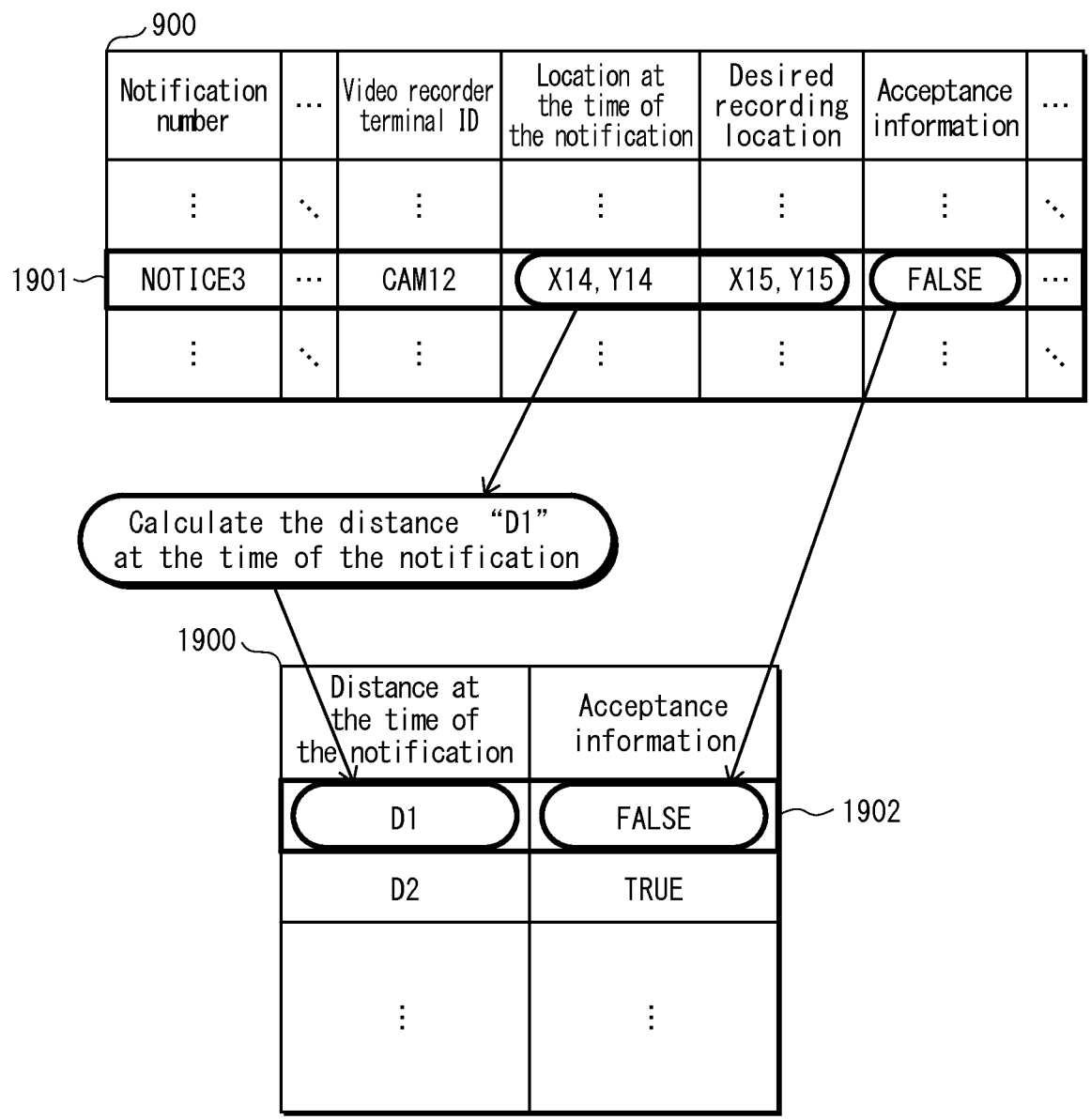
FIG. 19 shows processing of creating an actual acceptance database pertaining to Embodiment 1 of the present invention.

FIG. 19 shows the processing performed by the request notification terminal selecting unit 203 for creating the actual acceptance database 1900 when the video recorder terminal ID of the target terminal is "CAM10".

First, the request notification terminal selecting unit 203 selects, from the notification history information database 900 that is under the management of the notification history managing unit 206, one of the notification history records whose video recorder terminal ID field stores the video recorder terminal ID of the target terminal. The drawing shows that the notification history record 1901 whose notification number is "NOTICE3" is selected.

Next, the request notification terminal selecting unit 203 calculates the distance at the notification, which indicates the distance between the two locations, namely the location indicated by the field of the location at the time of the notification and the location indicated by the desired recording location field, both contained in the selected notification history record. The drawing shows that the distance "D1" at the time of the notification is calculated from the two locations indicated by the location information "X14, Y14" and "X15, Y15".

Next, the request notification terminal selecting unit 203 creates an actual acceptance record containing, as the values thereof, the distance at the time of the notification thus calculated and the acceptance information stored in the acceptance information field of the selected notification history record. The drawing shows that the actual acceptance record 1902 is created from the distance "D1" at the time of the notification and the acceptance information "FALSE" of the notification history record 1901.

The request notification terminal selecting unit 203 creates actual acceptance records from all the notification history records of the target terminal, and thereby creates the actual acceptance database 1900.

Returning to FIG. 18, the following is a continuation of the operations for calculating the broadcast expectation value of the target terminal.

After creating the actual acceptance database 1900, the request notification terminal selecting unit 203 calculates a distance tendency value indicating the request acceptance rates of the target terminal in the case the distance at the time of the notification is similar to the current distance (S1803).

According to the present embodiment, the distance is classified into a plurality of categories (0 m to 10 m, 10 m to 20 m, 20 m to 50 m, . . . , 5 km to 10 km, 10 km or longer). The request notification terminal selecting unit 203 specifies one of the categories as the current distance. Next, the request notification terminal selecting unit 203 extracts, from the actual acceptance database 1900, the records whose distance at the time of the notification belongs to the same category as the current distance. Finally, the request notification terminal selecting unit 203 determines, as the distance tendency value, the ratio of the number of the records whose acceptance information is "TRUE" to the total number of the extracted records.

Figure 20:
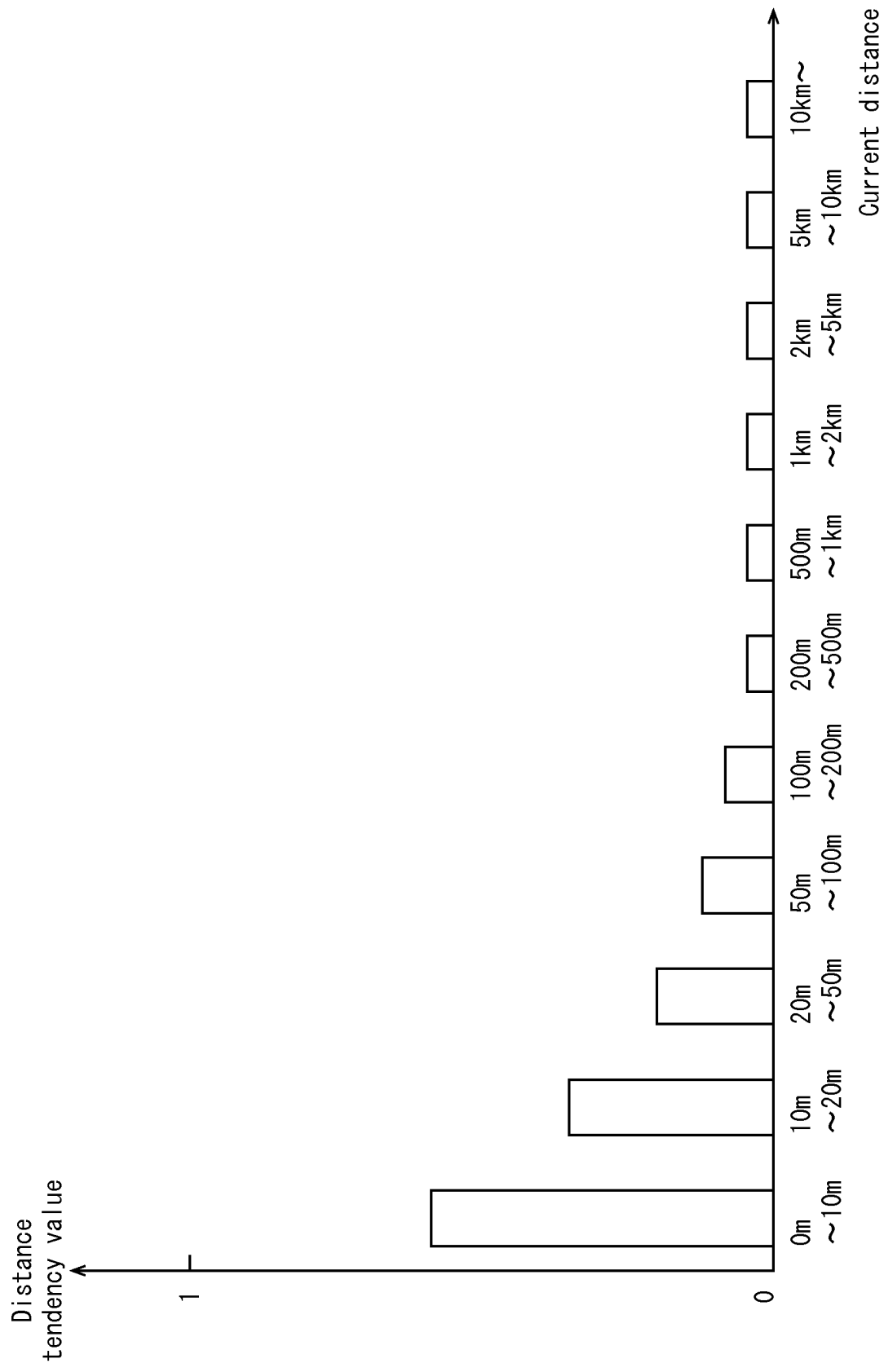
FIG. 20 shows an example relationship between a current distance and a distance tendency value pertaining to Embodiment 1 of the present invention.

For example, the distance tendency value is 0.3 when the following conditions are satisfied: the current distance of the target terminal is 15 m; the number of actual acceptance records whose distance at the time of the notification falls within the range from 10 m to 20 m; and the acceptance information of three records out of the ten records indicates "TRUE". It can be considered that the distance tendency value decreases as the current distance increases as shown in FIG. 20.

Returning to FIG. 18, the request notification terminal selecting unit 203 sets the distance tendency value thus calculated to the broadcast expectation value of the target terminal, and terminates the processing (S1804).

Note that broadcast expectation value will not be accurate when there is an insufficient number of notification history records of the video recorder terminal. Therefore, according to the live video delivery system pertaining to the present embodiment, a null value is set to the broadcast expectation value in Step S1803 when the number of the actual acceptance records belonging to the same category of the current distance is no greater than a predetermined number (e.g. 10). According to the live video delivery system pertaining to the present embodiment, the video recorder terminal whose broadcast expectation value is null is always provided with a notification of the delivery request in Step S1804. In other words, according to the live video delivery system pertaining to the present embodiment, the video recorder terminal whose notification history is not sufficient is always provided with a notification of the delivery request so as to accumulate the notification history.

2-3. Summary

According to the live video delivery system pertaining to the present embodiment, the location at the time of the notification, the desired recording location, and the acceptance information are recorded as the history of the notifications of the requests in the past. This structure allows for calculation of the broadcast expectation value of each video recorder terminal. The live video delivery system is therefore capable of selecting only video recorder terminals that are likely to accept the request and giving the notification to them.

That is, compared with conventional live video delivery systems, the live video delivery system pertaining to the present embodiment increases the probability of the delivery of the live video recorded at the location desired by the viewing user, and decreases the probability of unnecessary notification of the request to the recording users that are unwilling to accept the request. This is highly advantageous.

3. Modifications

As an embodiment of a communication server pertaining to the present invention, a live video delivery system is described above. The present invention, however, is not limited to the live video delivery system described above, and may be modified as follows. The following describes modifications of the present invention within the scope of the concept of the present invention.

(1. Calculation of Broadcast Expectation Value, Taking Time Information into Consideration)

The live video delivery system described above as an embodiment calculates the distance tendency value from the notification history in the past, based on the relationship between the location of the target terminal at the time of the notification and the desired recording location. That is, the live video delivery system described above as an embodiment uses only the information about the distance to the desired recording location in order to determine the degree of the tendency to accept the request (i.e. the willingness to broadcast the video).

The degree of the tendency of the recording user to accept the request varies depending on time attributes such as the day of the week and the time of day. For example, some recording users may not be able to accept a request on week days because of work, but may be able to accept a request on weekends. Some recording users may not be able to accept a request in the morning and the night because of housework, but may be able to accept a request during the day.

The live video delivery system pertaining to the present invention may be modified to use notification time information managed as history information and to calculate the broadcast expectation value taking the notification time information into consideration.

Figure 21:
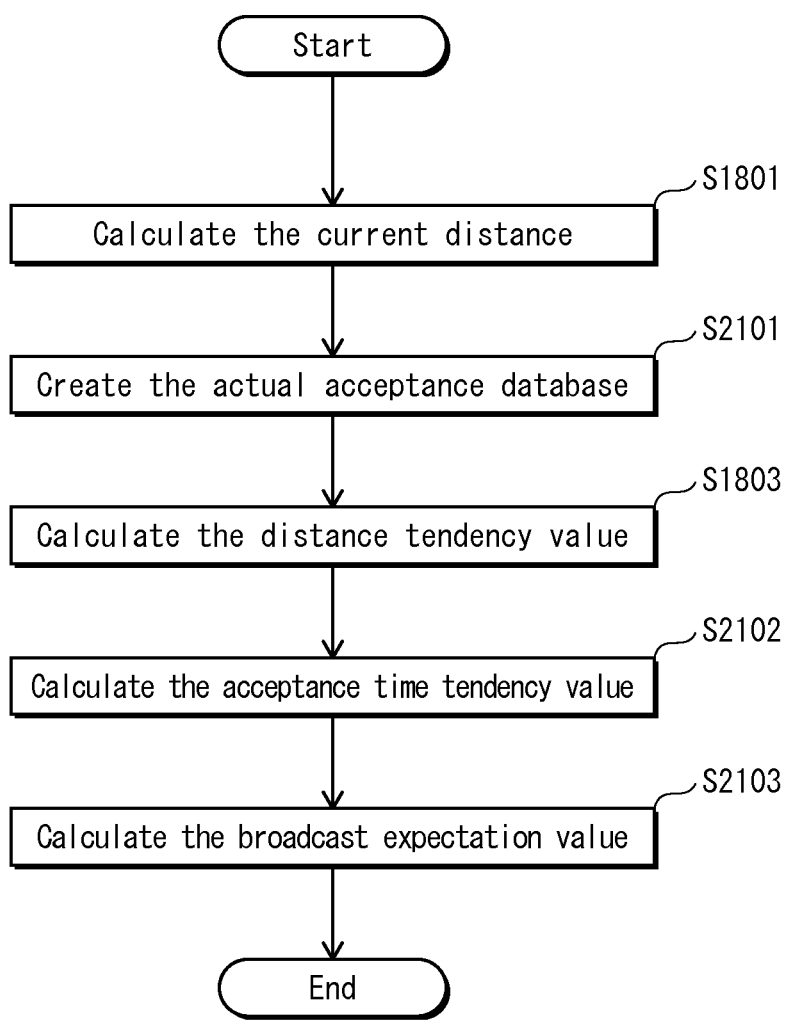
FIG. 21 is a flowchart for calculating the broadcast expectation value of the target terminal taking time information into consideration.

FIG. 21 is a flowchart showing operations for calculating the broadcast expectation value of the target terminal taking the time information into consideration. The same steps as contained in FIG. 18 are given the same reference numbers and their explanations will be omitted.

After Step S1801, the request notification terminal selecting unit 203 creates an actual acceptance database 2200 which shows the history of the acceptance of the requests notified to the target terminal in the past (S2101). Specifically, the actual acceptance database 2200 shows the relationship between the distance from the target terminal to the desired recording location at the time the notification was provided, the time at which the notification was made, and the acceptance information of the target terminal corresponding to the notification.

First, in the same manner as Step S1802, the request notification terminal selecting unit 203 selects one of the notification history records of the target terminal from the notification history information database 900, and calculates the distance at the time of the notification. Next, the request notification terminal selecting unit 203 creates an actual acceptance record by combining the distance at the time of the notification thus calculated, the notification time contained in the selected notification history record, and the acceptance information contained in the selected notification history record.

The request notification terminal selecting unit 203 creates actual acceptance records from all the notification history records of the target terminal, and thereby creates the actual acceptance database 2200.

FIG. 22 shows a specific example of the actual acceptance database 2200 created by the request notification terminal selecting unit 203.

After creating the actual acceptance database 2200, the request notification terminal selecting unit 203 moves to Step S1803, which is the step of calculating the distance tendency value.

After calculating the distance tendency value, the request notification terminal selecting unit 203 calculates a time tendency value indicating the acceptance rate of the request having the same time attribute as the current time (S2102).

For example, the time is classified into a plurality of categories (e.g. Sunday, Monday, . . . , Friday, Saturday). The request notification terminal selecting unit 203 specifies the category to which the current time belongs. Next, the request notification terminal selecting unit 203 extracts, from the actual acceptance database 2100, the records whose notification time belongs to the same category as the current time. Finally, the request notification terminal selecting unit 203 determines, as the time tendency value, the ratio of the number of the records whose acceptance information is "TRUE" to the total number of the extracted records.

As another modification, the time may be classified into morning, midday, evening and night, or be classified in units of hours or minutes. Furthermore, the time may be classified according to the combinations of the above, such as "Sunday, morning", "Sunday, midday", etc.

The request notification terminal selecting unit 203 calculates the broadcast expectation value of the target terminal by using the distance tendency value and the time tendency value thus calculated (S2103).

Specifically, the request notification terminal selecting unit 203 uses the geometric mean of the distance tendency value and the time tendency value as the broadcast expectation value. As another modification, the request notification terminal selecting unit 203 may use the arithmetic mean, the weighted mean, the product or the sum of the distance tendency value and the time tendency value. Alternatively, the distance tendency value or the time tendency value whichever is larger may be used as the broadcast expectation value.

(2. Calculation of Broadcast Expectation Value, Taking Location into Consideration Instead of Distance)

The degree of the tendency of the recording user to accept the request possibly changes depending on the current location of the recording user. For example, a recording user possibly cannot accept a request when he/she is at work or school.

The live video delivery system pertaining to the present invention may be modified to use notification time information managed as history information and to calculate the broadcast expectation value taking into consideration the variations in the degree of the tendency to accept the request depending on the location.

Figure 23:
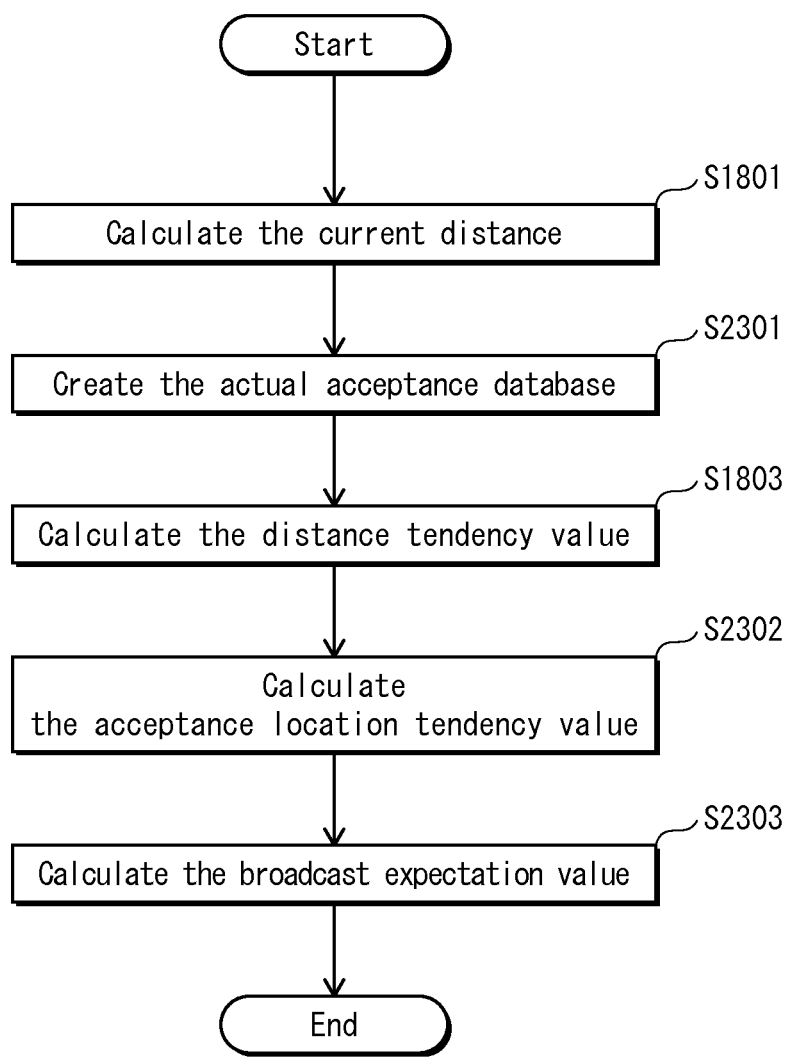
FIG. 23 is a flowchart for calculating the broadcast expectation value of the target terminal taking location information into consideration.

FIG. 23 is a flowchart showing operations for calculating the broadcast expectation value of the target terminal taking the location information into consideration. The same steps as contained in FIG. 18 are given the same reference numbers and their explanations will be omitted.

After Step S1801, the request notification terminal selecting unit 203 creates an actual acceptance database 2400 which shows the history of the acceptance of the requests notified to the target terminals in the past (S2301). Specifically, the actual acceptance database 2400 shows the relationship between the distance from the target terminal to the desired recording location at the time the notification was provided, the location of the target device at the time the notification was made, and the acceptance information of the target terminal corresponding to the notification.

First, in the same manner as Step S1802, the request notification terminal selecting unit 203 selects one of the notification history records of the target terminal from the notification history information database 900, and calculates the distance at the time of the notification. Next, the request notification terminal selecting unit 203 creates an actual acceptance record by combining the location at the time of the notification thus calculated and the acceptance information contained in the selected notification history record.

The request notification terminal selecting unit 203 creates actual acceptance records from all the notification history records of the target terminal, and thereby creates the actual acceptance database 2400.

FIG. 24 shows a specific example of the actual acceptance database 2400 created by the request notification terminal selecting unit 203.

After creating the actual acceptance database 2400, the request notification terminal selecting unit 203 moves to Step S1803, which is the step of calculating the distance tendency value.

After calculating the distance tendency value, the request notification terminal selecting unit 203 calculates a location tendency value indicating the request acceptance rate when the target terminal is provided with the notification within a predetermined range of the current location (e.g. within a 20 m radius) (S2302).

Specifically, the request notification terminal selecting unit 203 first calculates the distance between the location at the time of the notification and the current location for each actual acceptance record in the actual acceptance database 2400, and extracts the records whose location at the time of the notification is within a predetermined range of the current location. Then, the request notification terminal selecting unit 203 determines, as the location tendency value, the ratio of the number of the records whose acceptance information is "TRUE" to the total number of the extracted records.

The request notification terminal selecting unit 203 calculates the broadcast expectation value of the target terminal by using the distance tendency value and the location tendency value thus calculated (S2303).

Specifically, the request notification terminal selecting unit 203 uses the geometric mean of the distance tendency value and the location tendency value as the broadcast expectation value. As another modification, the request notification terminal selecting unit 203 may use the arithmetic mean, the weighted mean, the product or the sum of the distance tendency value and the location tendency value. Alternatively, the distance tendency value or the location tendency value whichever is larger may be used as the broadcast expectation value.

As yet another modification, a particular location for the recording user may be registered with the delivery server 210, and the delivery server 210 may not provide a notification of a request to the video recorder terminal 301 whose current location is within a certain range of the registered location.

(3. Structure with Consideration of the Category of the Subject of the Recording)

The degree of the tendency of the recording user to accept the request possibly changes according to the category of the desired recording location included in the delivery request, that is the category of the subject of the recording. In other words, when the recording user is interested in the subject of the recording, the recording user might travel all the way to the desired recording location even if the recording user is away from the desired recording location. On the other hand, when the recording user is not interested in the subject of the recording, the recording user might not accept the request even if the recording user is close to the desired recording location.

The live video delivery system pertaining to the present invention may be modified by adding a structure for managing a database associating the location information and the categories of the subject of the recording, so as to calculate the broadcast expectation value taking into consideration the variations in the degree of the tendency to accept the request depending on the category of the subject of the recording.

Figure 25:
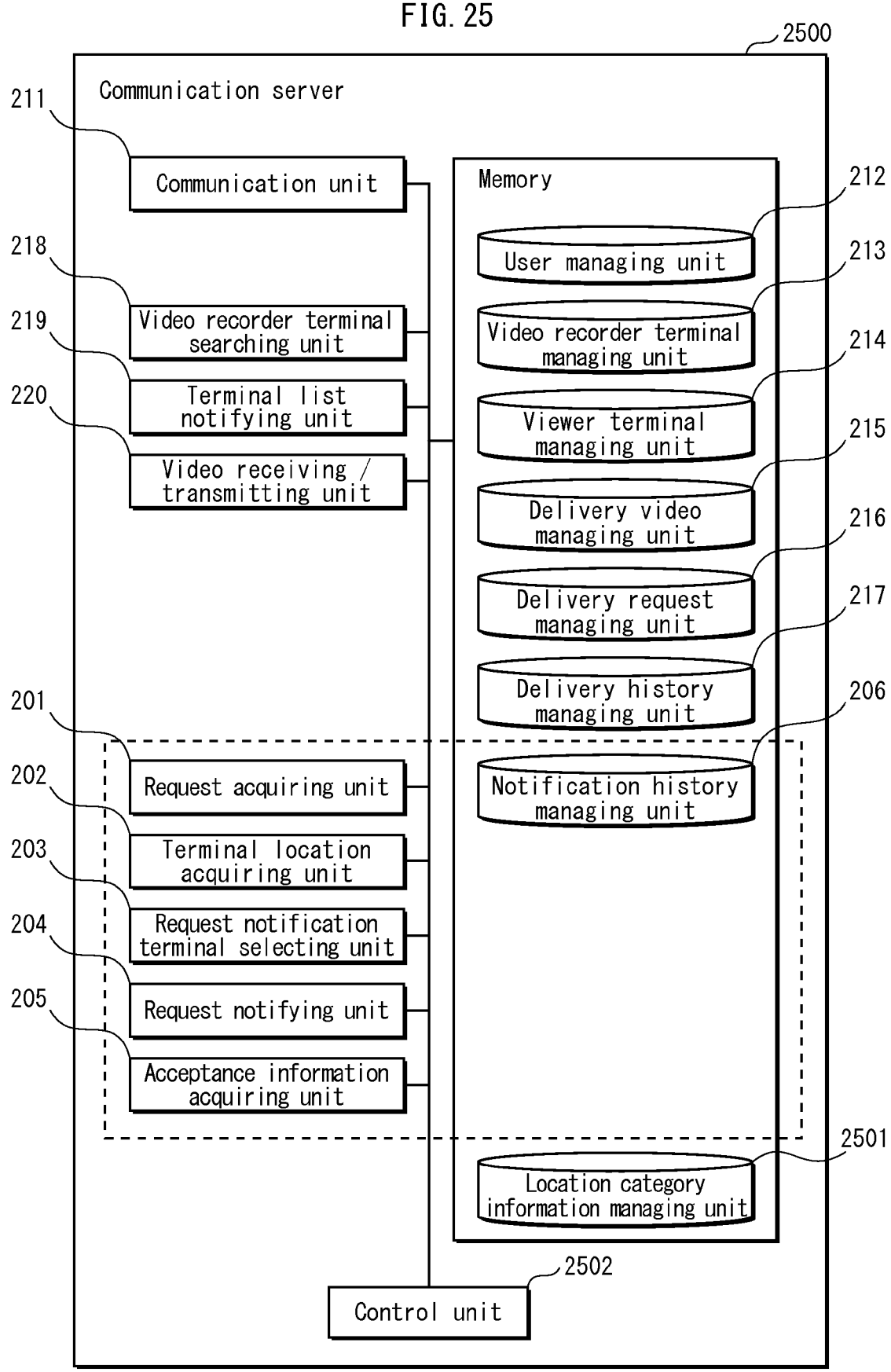
FIG. 25 shows an example functional structure of the delivery server taking into consideration variations in the degree of the tendency to accept the request, depending on the category of the subject of the recording.

FIG. 25 shows a functional structure of a delivery server 2500 taking into consideration the variations in the degree of the tendency to accept the request, depending on the category of the subject of the recording. The delivery server 2500 is structured by adding a location category information managing unit 2501 to the delivery server 210 shown in FIG. 3.

Figure 26:
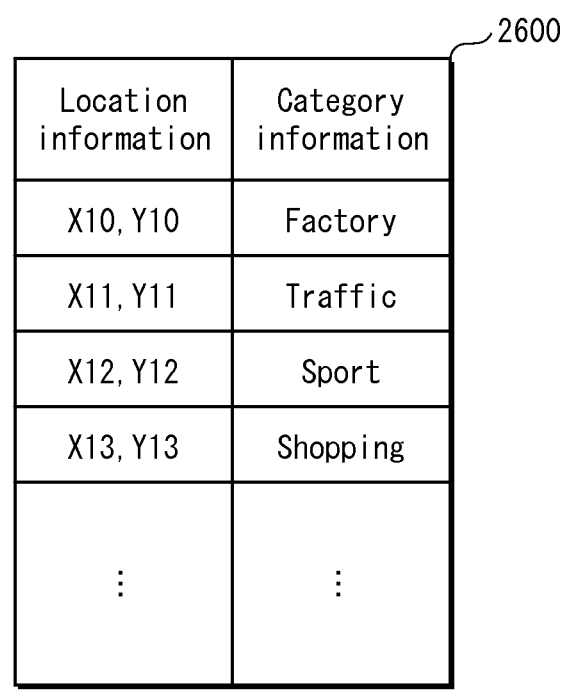
FIG. 26 shows an example of location category information.

The location category information managing unit 2501 manages a location category information database 2600 shown in FIG. 26. The location category information database 2600 is a database used for acquiring the category information based on the location information. Each record is composed of fields for location information and category information.

The location information field stores location information composed of the latitude and the longitude. The category information field stores category information representing what is at the location indicated by the location information, such as an object and scenery. For example, in the drawing, the category information of the location (X10, Y10) represents "Factory", and the category information of the location (X11, Y11) represents "Traffic".

Figure 27:
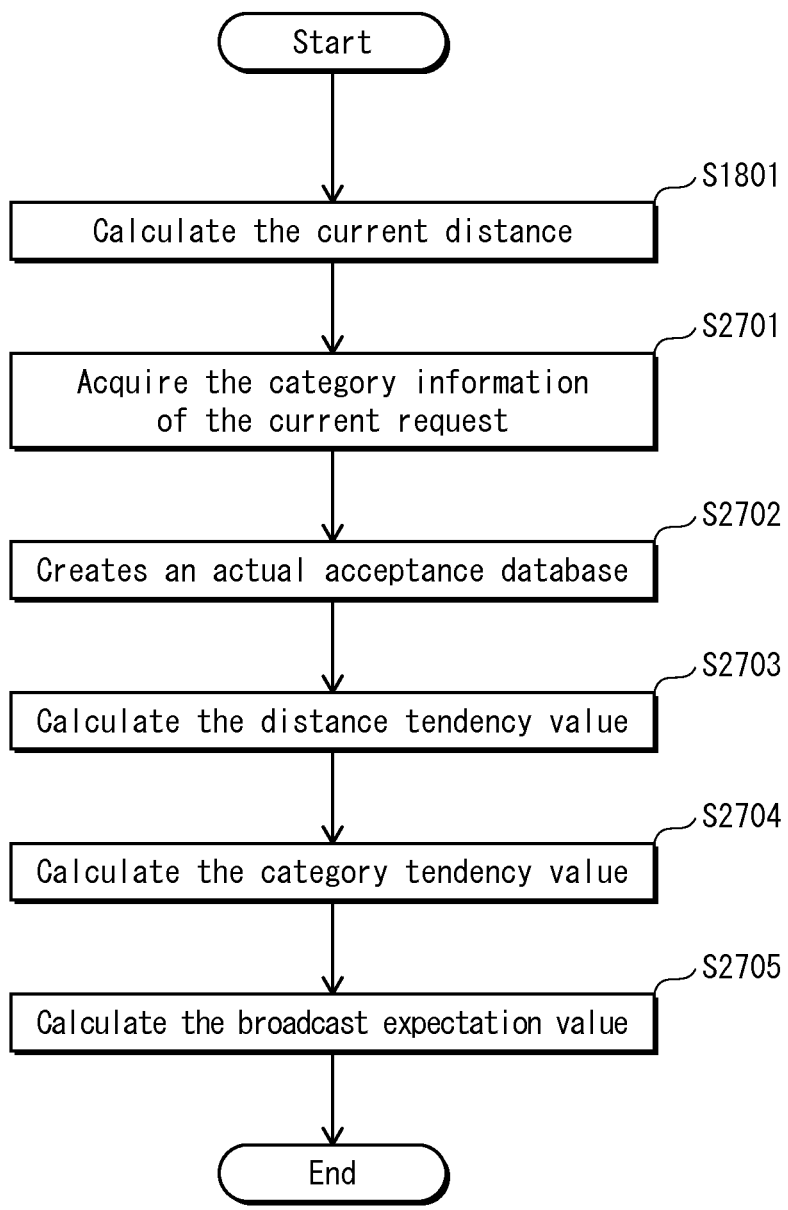
FIG. 27 is a flowchart for calculating the broadcast expectation value taking the category of the subject of the recording into consideration.

FIG. 27 is a flowchart showing operations performed by the request notification terminal selecting unit 203 of the delivery server 2500, for calculating the broadcast expectation value of the target terminal taking the subject of the recording into consideration. The same steps as contained in FIG. 18 are given the same reference numbers and their explanations will be omitted.

After Step S1801, the request notification terminal selecting unit 203 acquires the category information of the current request (current category information) by using the delivery request information database 700 that is under the management of the delivery request managing unit 216 and the location category information database 2500 that is under the management of the location category information managing unit 2501 (S2701). Specifically, the request notification terminal selecting unit 203 acquires the desired recording location of the target request from the delivery request information database 700, and the category information of the desired recording location of the target request from the location category information database 2600.

Next, the request notification terminal selecting unit 203 creates an actual acceptance database 2800 which shows the history of the acceptance of the requests notified to the target terminals in the past (S2702). Specifically, the actual acceptance database 2800 shows the relationship between the distance from the target terminal to the desired recording location at the time the notification was provided, the category information of the notified request (notification category information), and the acceptance information of the target terminal corresponding to the notification.

Figure 28:
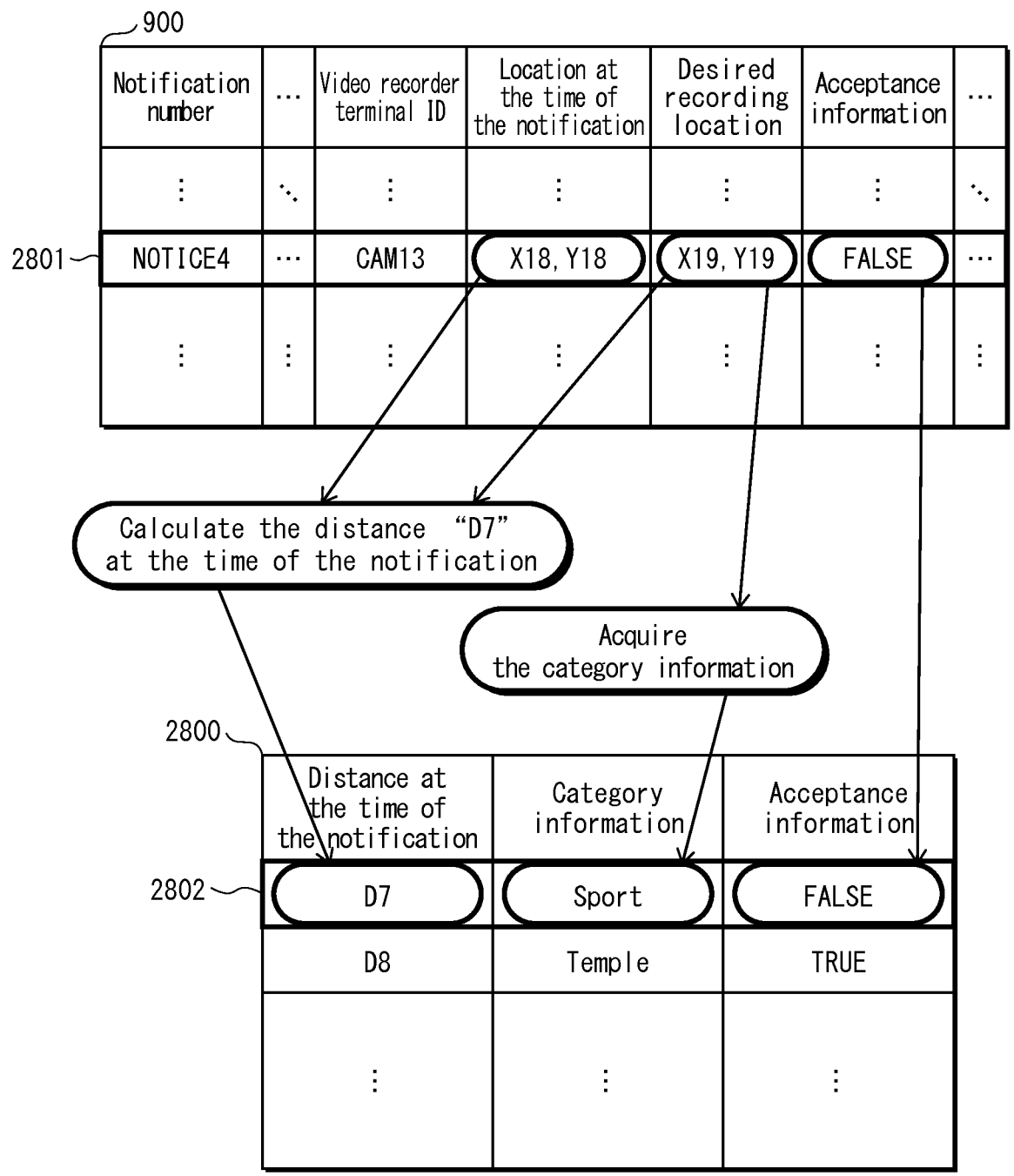
FIG. 28 shows operations for creating the actual acceptance database.

FIG. 28 shows operations performed by the request notification terminal selecting unit 203 to create the actual acceptance database 2800. First, in the same manner as Step S1802, the request notification terminal selecting unit 203 selects one of the notification history records (i.e. the notification history record 2801) of the target terminal from the notification history information database 900, and calculates the distance at the time of the notification. Then, the request notification terminal selecting unit 203 acquires the category information (notification category information) from the location category information database 2600 by using the desired recording location of the selected notification history record. Finally, the request notification terminal selecting unit 203 creates an actual acceptance record 2802 by combining the distance at the time of the notification thus calculated, the notification category information thus acquired, and the acceptance information contained in the selected notification history record.

The request notification terminal selecting unit 203 creates actual acceptance records from all the notification history records of the target terminal, and thereby creates the actual acceptance database 2800.

After creating the actual acceptance database 2800, the request notification terminal selecting unit 203 moves to Step S1803, which is the step of calculating the distance tendency value.

After calculating the distance tendency value, the request notification terminal selecting unit 203 calculates a category tendency value indicating the acceptance rate of the request having the same notification category information as the current category information (S2703).

Specifically, the request notification terminal selecting unit 203 extracts, from the actual acceptance database 2800, the actual acceptance records whose category information is the same as the current category information. Then, the request notification terminal selecting unit 203 determines, as the category tendency value, the ratio of the number of the records whose acceptance information is "TRUE" to the total number of the extracted records.

The request notification terminal selecting unit 203 calculates the broadcast expectation value of the target terminal by using the distance tendency value and the category tendency value thus calculated (S2704).

Specifically, the request notification terminal selecting unit 203 uses the geometric mean of the distance tendency value and the category tendency value as the broadcast expectation value. As another modification, the request notification terminal selecting unit 203 may use the arithmetic mean, the weighted mean, the product or the sum of the distance tendency value and the category tendency value. Alternatively, the distance tendency value or the category tendency value whichever is larger may be used as the broadcast expectation value.

(4. Selection Taking the Travelling Time into Consideration)

The live video delivery system described above as an embodiment relies only on the degree of the tendency to accept the request (i.e. the willingness to broadcast the video) to select the video recorder terminals to be notified of the delivery request.

With this structure, when taking the traveling time into consideration, if the video recorder terminal accepting the request needs to travel a long distance, it might take a long time from the receipt of the notification of the delivery request made by the viewing user to the actual broadcasting of the live video.

The live video delivery system pertaining to the present invention may be modified to calculate the broadcast expectation value taking the traveling distance of the video recorder terminal into consideration.

Figure 29:
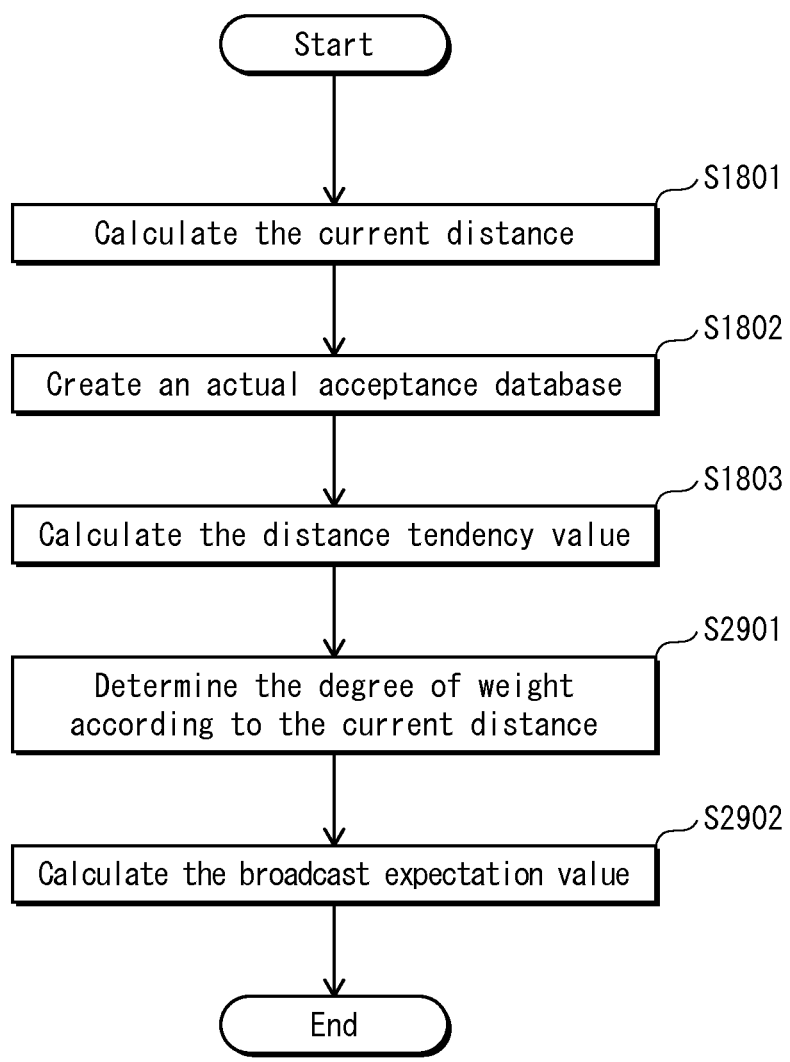
FIG. 29 is a flowchart for calculating the broadcast expectation value taking a travel distance of the video recorder terminal into consideration.

FIG. 29 is a flowchart showing operations for calculating the broadcast expectation value of the target terminal taking the traveling distance into consideration. The same steps as contained in FIG. 18 are given the same reference numbers and their explanations will be omitted.

After Step S1803, the request notification terminal selecting unit 203 determines the degree of weight according to the current distance calculated in Step S1801 such that the weight is set lower for a longer current distance (S2901).

After calculating the weight, the request notification terminal selecting unit 203 calculates, as the broadcast expectation value, the product of the distance tendency value calculated in Step S1803 and the weight calculated in Step S2901 (S2902).

As another modification, the broadcast expectation value may be obtained by subtracting a predetermined value (e.g. 0.1) from the distance tendency value when the current distance of the video recorder terminal is no less than a predetermined distance (e.g. 500 m). When there is no video recorder terminal whose current distance is no less than the predetermined distance, the distance tendency value may be used without change as the broadcast expectation value.

(5. Actual Acceptance Database for Each User, Using the User IDs)

The live video delivery system described above as an embodiment creates the actual acceptance database from the notification history records having the same video recorder terminal ID as the target terminal. However, the method of creating the actual acceptance database is not limited in this way.

For example, the user ID of the target terminal may be obtained from the video recorder terminal information database 500 that is under the management of the video recorder terminal managing unit 213, and the actual acceptance database may be created from the notification history records having the same user ID as the target terminal.

This structure allows for calculation of the broadcast expectation value taking into consideration the degree of the tendency of each recording user to accept the request, even when the recording user uses another video recorder terminal, when the recording user uses a plurality of video recorder terminals, and when a plurality of recording users share a video recorder terminal.

(6) According to the embodiment described above, the distance is classified into a plurality of categories (0 m to 10 m, 10 m to 20 m, 20 m to 50 m, . . . , 5 km to 10 km, 10 km or longer), and it is considered that distances belonging to the same category are substantially equal. However, such classification is not essential. For example, the distance may be classified into "very short distance (0 m to 20 m)", "short distance (20 m to 100 m)", "middle distance (100 m to 1 km)" and "long distance (1 km or longer)". Alternatively, two distances may be determined as substantially equal when the absolute value of the difference between the two distances is smaller than a predetermined value (e.g. 20 m), or when the ratio of one distance to the other falls within a predetermined range (e.g. from 0.9 to 1.1).

(7) According to the embodiment described above, the content to be created and delivered according to a request is video data. However, the present invention is not limited in such a way. For example, the present invention may be embodied as an apparatus for mediating requests for creation of digital content such as audio data and text data, instead of video data, that is valuable when created at the location of the accepter terminal.

(8) In the embodiment described above, the function of acquiring the delivery request from the viewer terminal 311 and giving the video recorder terminal 301 the notification of the acquired request, and the function of receiving the live video from the video recorder terminal 301 and delivering the received live video to the viewer terminal 311 may be realized by using separate servers.

(9) In the embodiment above, the video recorder terminal list displayed by the viewer terminal 311 may be dynamically updated. In other words, when the video recorder terminal information database 500 is updated while the viewer terminal 311 is displaying the video recorder terminal list, the information about the update may be transmitted to the viewer terminal 311, and the video recorder terminal list being displayed by the viewer terminal 311 may be updated accordingly.

More specifically, the delivery server 210 may further include a component for transmit update information to the viewer terminal 311 when the location information field, the broadcast status field, or the like of the record of the video recorder terminal information database 500 corresponding to the video recorder terminal 301 shown in the list, or when one or more video recorder terminal records additionally satisfy, for example, the condition transmitted by the viewer terminal 311 or the condition that the location of the video recorder terminal 301 is within a predetermined range (e.g. within 100 m range) of the desired recording location specified in the delivery request.

This structure allows the viewing user to be timely informed of the increase or decrease of the number of the video recorder terminals that have the possibility to become the video recorder terminal 301 or the change in the locations of such video recorder terminals even while the viewing user is in the process of selecting the video recorder terminal 301.

(10) In "2-2-2. Processing 2 for starting the delivery of the live video" above, the delivery server 210 acquires the acceptance information from the video recorder terminal 301 in an explicit manner (S1306). However, the present invention is not limited in this way. For example, the delivery server 210 may regard the notification of the commencement of the video transmission from the video recorder terminal 301 made in Step S1312 as the transmission of the acceptance information indicating the acceptance of the delivery request.

The delivery history information database 800, which is under the management of the delivery history managing unit 217, contains the request numbers showing the correspondence between the delivery requests and the delivery videos. It is therefore possible to know whether the video recorder terminal 301 actually accepted each requester not. Therefore, the delivery server 210 may obtain the acceptance information by referring to the delivery history information database 800 to determine whether or not the video recorder terminal 301 actually accepted the delivery request.

(11) The elements of the embodiment and the modifications may be partially combined.

(12) The Request notification terminal selection and the broadcast expectation value calculation described above as per embodiment 1 may be realized by distributing a control program recorded on a recording medium or distributing a control program via any of various types of communication channels, the control program being composed of program codes written in a machine language or a high-level language for operating the processor of the delivery server or various types of circuits connected to the processor. Examples of such a recording medium include an IC card, a hard disk, an optical disc, a flexible disk, a ROM, a flash memory, and so on. The distributed control program is used after being stored in a memory or the like that can be read by the processor, and the functions described in the above can be realized by the processor executing the control program. The processor may directly execute the control program, or execute it after compiling. Alternatively, an interpreter may execute the control program.

(13) Each functional component of the embodiment and the modifications described above may be realized as a circuit executing the function, or may be realized by one or more processors executing a program. Note that each functional block of the delivery server is typically realized as an LSI, which is a kind of integrated circuit. Each block may be realized as a single chip. Alternatively, part or all of the units may be included in a single chip. Although LSI is mentioned above, the term IC, system LSI, super LSI, or ultra LSI may be used according to the degree of integration. Further, the integration method is not limited to LSI. The integrated circuit may also be realized as a private circuit or a general-purpose processor. After LSI manufacture, a FPGA (Field Programmable Gate Array), which is programmable, or a reconfigurable processor, in which the setting of, and the connections between the circuit cells within the LSI are reconfigurable, may also be used. Further still, advances and discoveries in semiconductor technology may lead to a new technology replacing LSI. The present invention may, of course, be applied to such future functional block technology. The application of biotechnology and the like is also plausible.

4. Supplemental Descriptions

The following further describes the structure, modifications, and advantageous effects of the communication server as an embodiment of the present invention.

(A) A communication server as an embodiment of the present invention includes: a request acquiring unit that acquires a request for content creation with specification of a desired location for the content creation; a terminal location acquiring unit that acquires locations of a plurality of accepter terminals, each capable of performing the content creation; a notifying unit that provides a notification of the request to an accepter terminal selected from among the plurality of accepter terminals; an acceptance information acquiring unit that acquires acceptance information showing whether or not the selected accepter terminal provided with the notification of the request has accepted the request; a history managing unit that manages history information showing a history of notifications provided to each of the plurality of accepter terminals by the notifying unit in the past, the history information containing for each notification: a location at the time of provision of the notification, of the accepter terminal provided with the notification; a desired location specified in a corresponding request; and the acceptance information; and a selecting unit that, upon acquisition of a new request, selects an accepter terminal to which the notifying unit provides a notification of the new request, according to: the locations of the plurality of accepter terminals; a desired location specified in the new request; and the history information.

With this structure, the communication server is capable of obtaining the degree of tendency of each accepter terminal to accept a request according to the distance of each accepter terminal, and providing a notification to the accepter terminals that are likely to accept the request, according to the personalities of the users of the accepter terminals.

(B) In the communication server described in (A) above, upon the acquisition of the new request, the selecting unit may calculate an expectation value showing a probability of accepting the new request for each of the plurality of accepter terminals by using: the locations of the plurality of accepter terminals; the desired location specified in the new request; and the history information, and may select the accepter terminal to which the notification unit provides the notification of the new request, according to the expectation value.

With this structure, the communication server is capable of providing the notification to the accepter terminals that are highly expected to accept the request.

(C) In the communication server described in (B) above, when a distance between the desired location and a location of the accepter terminal at the time of acquisition of the new request is defined as a current distance, and a distance between two locations of the accepter terminal contained in the history information is defined as a notification distance, the selecting unit may calculate a distance tendency value with respect to notifications provided to each of the plurality of accepter terminals in the past, by using the current distance and the notification distance of each of the plurality of accepter terminals, and sets the distance tendency value as the expectation value, the distance tendency value showing a request acceptance rate of the corresponding accepter terminal when the notification distance is an approximation of the current distance.

With this structure, the communication server is capable of selecting the accepter terminals that are highly expected to accept the request, based on the request acceptance rate (the distance tendency value) under the same condition as the current request (the distance to the desired recording location), calculated with respect to the notifications provided to the accepter terminals in the past.

(D) In the communication server described in (C) above, the history information may further include time of each notification, and the selecting unit may calculate a time tendency value with respect to the notifications provided to each of the plurality of accepter terminals in the past, and may calculate the expectation value by using the distance tendency value and the time tendency value, the time tendency value showing a request acceptance rate of the corresponding accepter terminal when a time attribute of the new request is the same as current time.

With this structure, the communication server is capable of selecting the accepter terminals that are highly expected to accept the request, based on the request acceptance rate (the distance tendency value and the time tendency value) under the same condition as the current request (the distance to the desired recording location and the time attribute), calculated with respect to the notifications provided to the accepter terminals in the past.

(E) In the communication server described in (C) above, when a location of the accepter terminal at the time of acquisition of the new request is defined as a current location, and locations of the accepter terminal at the time of provision of the notifications contained in the history information are defined as notification locations, the selecting unit may calculate a location tendency value with respect to the notifications provided to each of the plurality of accepter terminals in the past, by using the current location and the notification location of each of the plurality of accepter terminals, and may calculate the expectation value by using the distance tendency value and the location tendency value, the location tendency value showing a request acceptance rate of the corresponding accepter terminal when the notification location corresponding to the new request is within a predetermined range of the current location.

With this structure, the communication server is capable of selecting the accepter terminals that are highly expected to accept the request, based on the request acceptance rate (the distance tendency value and the location tendency value) under the same condition as the current request (the distance to the desired recording location and the location at the time of the provision of the notification), calculated with respect to the notifications provided to the accepter terminals in the past.

(F) In the communication server described in (C) above, the selecting unit may correct the distance tendency value according to the current distance, and may set the distance tendency value after the correction as the expectation value.

With this structure, the communication server is capable of selecting preferentially the accepter terminals that take a short time to travel to the desired location from among the accepter terminals that are highly expected to accept the request. Therefore, the communication server can reduce the time from when the requester makes a request until the accepter fulfills the request.

(G) The communication server described in (C) above may further comprise a location category information managing unit that manages location category information associating locations and categories with each other, wherein when a category corresponding to the desired location in the history information is defined as a notification category, and a category corresponding to the desired location specified in the request is defined as a current category, the selecting unit may calculate a category tendency value with respect to the notifications provided to each accepter terminal in the past, and may calculate the expectation value by using the distance tendency value and the category tendency value, the category tendency value showing a request acceptance rate of the corresponding accepter terminal when the notification category corresponding to the new request is the same as the current category.

With this structure, the communication server is capable of selecting the accepter terminals that are highly expected to accept the request, based on the request acceptance rate (the distance tendency value and the category tendency value) under the same condition as the current request (the distance to the desired recording location and the category information), calculated with respect to the notifications provided to the accepter terminals in the past.

(H) In the communication server described in (A) above, the history information may further include user identifiers for identifying users of accepter terminals provided with the notifications, and upon the acquisition of the new request, the selecting unit may calculate an expectation value showing a probability of accepting the new request for each of the users of the accepter terminals by using: the locations of the accepter terminals at the time of the acquisition of the new request; the desired location specified in the new request; and the history information, and may select the accepter terminal to which the notifying unit provides the notification of the new request, according to the expectation value.

With this structure, even when a plurality of users use a same accepter terminal, the communication server is capable of calculating the expectation value of each of the users. Furthermore, even when a single user uses a plurality of accepter terminals, the communication server is capable of calculating a common expectation value.

(I) In the communication server described in (A) above, the history information may contain, for each notification, a notification distance of each of the accepter terminals instead of the notification location and the desired location, the notification distance showing a distance from the notification location to the desired location.

With this structure, the communication server only needs to stores one-dimensional distance information, which means the amount of data to be stored is smaller than the case of storing the location information of two points.

INDUSTRIAL APPLICABILITY

The present invention is applicable to servers for delivering information content. Examples of the content include, in addition to video data, digital content such as audio data, text data.

REFERENCE SIGNS LIST 100 communication network
200 communication server
310 requester terminal
300 accepter terminal
201 request acquiring unit
202 terminal location acquiring unit
203 request notification terminal selecting unit
204 request notifying unit
205 acceptance information acquiring unit 206 notification history managing unit
101 Internet
301 video recorder terminal
311 viewer terminal
210 delivery server
211 communication unit
212 user managing unit
213 video recorder terminal managing unit
214 viewer terminal managing unit
215 delivery video managing unit
216 delivery request managing unit
217 delivery history managing unit
218 video recorder terminal searching unit
219 terminal list notifying unit
220 video receiving/transmitting unit
221 control unit
2500 delivery server
2501 location category information managing unit
2502 control unit

The invention claimed is:

1. A communication server comprising:
a request acquiring unit that acquires a request for content creation with specification of a desired location for the content creation;
a terminal location acquiring unit that acquires locations of a plurality of accepter terminals each capable of performing the content creation;
a notifying unit that provides a notification of the request to an accepter terminal selected from among the plurality of accepter terminals;
an acceptance information acquiring unit that acquires acceptance information showing whether or not the selected accepter terminal provided with the notification of the request has accepted the request;
a history managing unit that manages history information showing a history of notifications provided to each of the plurality of accepter terminals by the notifying unit in the past, the history information containing for each notification: a location at the time of provision of the notification, of an accepter terminal provided with the notification; a desired location specified in a corresponding request; and the acceptance information; and
a selecting unit that, upon acquisition of a new request, selects an accepter terminal to which the notifying unit provides a notification of the new request, according to: the locations of the plurality of accepter terminals; a desired location specified in the new request; and the history information, wherein
upon the acquisition of the new request, the selecting unit calculates expectation values showing a probability of accepting the new request for each of the plurality of accepter terminals by using: the locations of the plurality of accepter terminals; the desired location specified in the new request; and the history information, and selects the accepter terminal to which the notifying unit provides the notification of the new request, according to the expectation value.

2. The communication server of claim 1, wherein
when a distance between the desired location and a location of the accepter terminal at the time of acquisition of the new request is defined as a current distance, and a distance between two locations of the accepter terminal contained in the history information is defined as a notification distance,
the selecting unit calculates a distance tendency value with respect to notifications provided to each of the plurality of accepter terminals in the past, by using the current distance and the notification distance of each of the plurality of accepter terminals, and sets the distance tendency value as the expectation value, the distance tendency value showing a request acceptance rate of the corresponding accepter terminal when the notification distance is an approximation of the current distance.

3. The communication server of claim 2, wherein
the history information further includes time of each notification, and
the selecting unit calculates a time tendency value with respect to the notifications provided to each of the plurality of accepter terminals in the past, and calculates the expectation value by using the distance tendency value and the time tendency value, the time tendency value showing a request acceptance rate of the corresponding accepter terminal when a time attribute of the new request is the same as current time.

4. The communication server of claim 2, wherein
when a location of the accepter terminal at the time of acquisition of the new request is defined as a current location, and locations of the plurality of accepter terminal at the time of provision of the notifications contained in the history information are defined as notification locations,
the selecting unit calculates a location tendency value with respect to the notifications provided to each of the plurality of accepter terminals in the past, by using the current location and the notification location of each of the plurality of accepter terminals, and calculates the expectation value by using the distance tendency value and the location tendency value, the location tendency value showing a request acceptance rate of the corresponding accepter terminal when the notification location corresponding to the new request is within a predetermined range of the current location.

5. The communication server of claim 2, wherein
the selecting unit corrects the distance tendency value according to the current distance, and sets the distance tendency value after the correction as the expectation value.

6. The communication server of claim 2 further comprising:
a location category information managing unit that manages location category information associating locations and categories with each other, wherein
when a category corresponding to the desired location in the history information is defined as a notification category, and a category corresponding to the desired location specified in the new request is defined as a current category,
the selecting unit calculates a category tendency value with respect to the notifications provided to each of the plurality of accepter terminals in the past, and calculates the expectation value by using the distance tendency value and the category tendency value, the category tendency value showing a request acceptance rate of the corresponding accepter terminal when the notification category corresponding to the new request is the same as the current category.

7. The communication server of claim 1, wherein
the history information further includes user identifiers for identifying users of accepter terminals provided with the notifications, and
upon the acquisition of the new request, the selecting unit calculates an expectation value showing a probability of accepting the new request for each of the users of the plurality of accepter terminals by using: the locations of the plurality of accepter terminals at the time of the acquisition of the new request; the desired location specified in the new request; and the history information, and selects the accepter terminal, to which the notifying unit provides the notification of the new request, according to the expectation value.

8. The communication server of claim 1, wherein the history information contains, for each notification, a notification distance of each of the accepter terminals instead of the notification location and the desired location, the notification distance showing a distance from the notification location to the desired location.

9. A communication method comprising:
a request acquiring step of acquiring a request for content creation with specification of a desired location for the content creation;
a terminal location acquiring step of acquiring locations of a plurality of accepter terminals each capable of performing the content creation;
a notifying step of providing a notification of the request to an accepter terminal selected from among the accepter terminals;
an acceptance information acquiring step of acquiring acceptance information showing whether or not the selected accepter terminal provided with the notification of the request has accepted the request;
a history managing step of managing history information showing a history of notifications provided to each of the plurality of accepter terminals in the notifying step in the past, the history information containing for each notification: a location at the time of provision of the notification, of an accepter terminal provided with the notification; a desired location specified in a corresponding request; and the acceptance information; and
a selecting step, upon acquisition of a new request, of selecting an accepter terminal to which a notification of the new request is provided in the notifying step, according to: the locations of the plurality of accepter terminals; a desired location specified in the new request; and the history information, wherein
upon the acquisition of the new request, the selecting step includes calculating expectation values showing a probability of accepting the new request for each of the plurality of accepter terminals by using: the locations of the plurality of accepter terminals; the desired location specified in the new request; and the history information, and selecting the accepter terminal to which the notifying step provides the notification of the new request, according to the expectation value.

10. A computer-readable non-transitory recording medium on which a program for causing a computer to perform request notification processing is recorded, the request notification processing comprising:
a request acquiring step of acquiring a request for content creation with specification of a desired location for the content creation;
a terminal location acquiring step of acquiring locations of a plurality of accepter terminals each capable of performing the content creation;
a notifying step of providing a notification of the request to an accepter terminal selected from among the accepter terminals;
an acceptance information acquiring step of acquiring acceptance information showing whether or not the selected accepter terminal provided with the notification of the request has accepted the request;
a history managing step of managing history information showing a history of notifications provided to each of the plurality of accepter terminals in the notifying step in the past, the history information containing for each notification: a location at the time of provision of the notification, of an accepter terminal provided with the notification; a desired location specified in a corresponding request; and the acceptance information; and
a selecting step, upon acquisition of a new request, of selecting an accepter terminal to which a notification of the new request is provided in the notifying step, according to: the locations of the plurality of accepter terminals; a desired location specified in the new request; and the history information, wherein
upon the acquisition of the new request, the selecting step includes calculating expectation values showing a probability of accepting the new request for each of the plurality of accepter terminals by using: the locations of the plurality of accepter terminals; the desired location specified in the new request; and the history information, and selecting the accepter terminal to which the notifying step provides the notification of the new request, according to the expectation value.

11. An integrated circuit used in a communication server, comprising:
a request acquiring unit that acquires a data creation request specifying a desired location for data creation from a requester terminal;
a terminal location acquiring unit that acquires locations of a plurality of accepter terminals each capable of performing the data creation;
a notifying unit that provides a notification of the request to an accepter terminal selected from among the accepter terminals;
an acceptance information acquiring unit that acquires acceptance information showing whether or not the selected accepter terminal provided with the notification of the request has accepted the request;
a history managing unit that manages history information showing a history of notifications provided to each of the plurality of accepter terminals by the notifying unit in the past, the history information containing for each notification: a location at the time of provision of the notification, of an accepter terminal provided with the notification; a desired location specified in a corresponding request; and the acceptance information; and
a selecting unit that, upon acquisition of a new request, selects an accepter terminal to which the notifying unit provides a notification of the new request, according to: the locations of the plurality of accepter terminals; a desired location specified in the new request; and the history information, wherein
upon the acquisition of the new request, the selecting unit calculates expectation values showing a probability of accepting the new request for each of the plurality of accepter terminals by using: the locations of the plurality of accepter terminals; the desired location specified in the new request; and the history information, and selects the accepter terminal to which the notifying unit provides the notification of the new request, according to the expectation value.

* * * * *